US010742483B2

(12) United States Patent
Li et al.

(10) Patent No.: US 10,742,483 B2
(45) Date of Patent: Aug. 11, 2020

(54) NETWORK FAULT ORIGINATOR IDENTIFICATION FOR VIRTUAL NETWORK INFRASTRUCTURE

(71) Applicant: AT&T Intellectual Property I, L.P., Atlanta, GA (US)

(72) Inventors: Wen-Jui Li, Bridgewater, NJ (US); Tsong-Ho Wu, Englishtown, NJ (US); Wai Sum Lai, Lincoln, NE (US); Zosim Kanevsky, Wayne, NJ (US); Jun-Min Liu, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 124 days.

(21) Appl. No.: 15/981,305

(22) Filed: May 16, 2018

(65) Prior Publication Data
US 2019/0356535 A1 Nov. 21, 2019

(51) Int. Cl.
*H04L 1/00* (2006.01)
*H04L 12/26* (2006.01)
*H04L 12/24* (2006.01)

(52) U.S. Cl.
CPC ........ *H04L 41/0631* (2013.01); *H04L 41/069* (2013.01); *H04L 43/0811* (2013.01)

(58) Field of Classification Search
CPC ............. H04L 41/0668; H04L 41/0618; H04L 41/065; H04L 41/0622; H04Q 2011/0081
See application file for complete search history.

(56) References Cited

U.S. PATENT DOCUMENTS 6,012,152 A 1/2000 Douik et al.
6,414,595 B1 7/2002 Scrandis et al.
(Continued)

FOREIGN PATENT DOCUMENTS

CA 2424352 12/2001
CN 100388691 5/2008
(Continued)

OTHER PUBLICATIONS

Kaiser et al., "Kinesthetics eXtreme: An External Infrastructure for Monitoring Distributed Legacy Systems," Proceedings of the IEEE Autonomic Computing Workshop 2003, Jun. 25, 2003, IEEE 2003.
(Continued)

*Primary Examiner* — Abdelillah Elmejjarmi
(74) *Attorney, Agent, or Firm* — Hartman & Citrin LLC

(57) ABSTRACT

Concepts and technologies directed to network fault originator identification for virtual network infrastructure are disclosed herein. Embodiments can include a control system that is communicatively coupled with network infrastructure. The control system can include a processor and memory that, upon execution, causes the control system to perform operations. The operations can include determining, based on a source ticket, a network fault condition associated with the network infrastructure. The operations can further include identifying, from the source ticket, a trap set and an alarm set that are associated with origination of the network fault condition. The operations can include the control system collecting network event data from the network infrastructure prior to a polling time of a fault reporting schedule; determining that a qualified source ticket should be created; and generating the qualified source ticket based on the network event data.

17 Claims, 15 Drawing Sheets

(56) References Cited

U.S. PATENT DOCUMENTS

| | | | |
|---|---|---|---|
| 6,571,285 | B1 | 5/2003 | Groath et al. |
| 6,816,461 | B1 | 11/2004 | Scrandis et al. |
| 7,257,744 | B2 | 8/2007 | Sabet et al. |
| 7,529,192 | B2 | 5/2009 | Labovitz |
| 7,779,238 | B2 | 8/2010 | Kosche et al. |
| 7,817,564 | B2 | 10/2010 | Puttu et al. |
| 7,953,847 | B2 | 5/2011 | Grelewicz et al. |
| 7,965,620 | B2 | 6/2011 | Gadgil et al. |
| 8,059,548 | B1 * | 11/2011 | Bisarya ............... G06F 11/3006 370/242 |
| 8,259,587 | B2 | 9/2012 | Cuni et al. |
| 9,154,383 | B2 | 10/2015 | Manuel-Devadoss et al. |
| 9,560,109 | B2 | 1/2017 | Wilson et al. |
| 2003/0225746 | A1 * | 12/2003 | Braun ............... G06F 16/24568 |
| 2007/0177523 | A1 | 8/2007 | Nagami et al. |
| 2008/0181099 | A1 * | 7/2008 | Torab ................. H04L 41/0631 370/216 |
| 2011/0141914 | A1 | 6/2011 | Yang et al. |
| 2012/0117109 | A1 * | 5/2012 | Bauernfeind ....... H04L 41/0213 707/769 |
| 2013/0198379 | A1 | 8/2013 | Rebella et al. |
| 2016/0170848 | A1 * | 6/2016 | Yang .................. G06F 11/2023 714/4.12 |
| 2016/0315829 | A1 * | 10/2016 | Zhou ....................... H04L 41/50 |

FOREIGN PATENT DOCUMENTS

| | | |
|---|---|---|
| CN | 100461688 | 2/2009 |
| CN | 101150431 | 5/2011 |
| CN | 102571407 | 7/2012 |
| JP | H11288382 | 10/1999 |
| KR | 100933991 | 12/2009 |
| WO | WO 2005/082092 | 9/2005 |

OTHER PUBLICATIONS

Sterritt, Roy, "Pulse Monitoring: Extending the Health-check for the Autonomic GRID," Proceedings of the 2003 IEEE International Conference on Industrial Informatics, Aug. 21-24, 2003, IEEE 2003.

Sterritt, Roy, "Autonomic Networks: Engineering the Self-Healing Property," Engineering Applications of Artificial Intelligence, Oct. 2004, vol. 17, Issue 7, pp. 727-739.

Steinder et al., "A survey of fault localization techniques in computer networks," Science of Computer Programming, 53.2, Jul. 1, 2004, pp. 165-194, Elsevier B.V. 2004.

Grover, Wayne D., "Self-Organizing Broad-Band Transport Networks," Proceedings of the IEEE, Oct. 1997, vol. 85, No. 10, pp. 1582-1611.

* cited by examiner

SOURCE TICKET 155

| RESTORE DURATION (155A) | TICKET STATE (155B) | NET RESOLUTION CONDITION TEXT (155C) | TIME/DATE FAULT REPORTED (155D) | TICKET CLOSED DATE (155E) | TICKET NUMBER (155F) | ASSET ID (155G) | NET ELMNT (155H) | NETWORK FAULT CONDITION (155I) | ACTIVE ORG (155J) | WORK QUEUE (155K) |
|---|---|---|---|---|---|---|---|---|---|---|
| 11 (MIN) | CLOSED | CIRCUIT AEO.22 BOUNCED | 1/20/2025 8:58:37 AM | 1/20/2025 9:10:30 AM | 226626951 | REANV401ME6 | vPE | MPLS LDP Session Down – State: nonexistent, Reasons: peerSentNotification, Neighbor Interface: 536 | IPNRC-CBB | IP-VRTL-OPS |

| Alarm contents | | | |
|---|---|---|---|
| ALARM TIMESTAMP (169A) | ALARM SOURCE (169B) | ALARM TEXT (169C/169D) | |
| Fri Jan 20 08:51:23 2025 (1484902283) | reanv401me6.els-an.att.net:Traps | MPLS LDP Session Down - State: nonexistent, Reason: peerSentNotification, Neighbor Interface: 536 | |

| Trap contents | | | |
|---|---|---|---|
| Trap Timestamp (169E) | Trap Source (169F) | Trap Name and Varbinds (169G/169H) | |
| Fri Jan 20 08:50:22 2025 | reanv401me6.els-an.att.net | jnxLdpSesDown: <br>[1] jnxMplsLdpSesState: nonexistent(1) <br>[2] jnxLdpSesDownReason: peerSentNotification (8) <br>[3] jnxLdpSesDownIf: neighbor's interface 536 | |

*FIG. 1E*

| 174A | 174B | 174C | 174D |
|---|---|---|---|
| Timestamp | Traps | Alarms | Ticket |
| 8:50:20 | SNMP_TRAP_LINK_DOWN (TOA ae6 traps and syslogs) (0) | | |
| 8:50:20 | SNMP_TRAP_LINK_DOWN (TOA xe-1/0/84 traps and syslogs) (0) | | |
| 8:50:22 | jnxLdpSesDown (vPE) (1) | | |
| 8:50:23 | Linkdown (CRS ifindex 1061; TenGigE2/10/0/14) | | |
| 8:50:23 | Linkdown (CRS ifindex 1411; Bundle-Ether4044) | | |
| 8:50:23 | mplsLdpSessionDown (CRS) | | |
| 8:50:23 | Neighbor State Change (CRS Down) (2) | | |
| 8:50:58 | Neighbor State Change (vPE Down) | | |
| 8:51:23 | | MPLS LDP Session Down (vPE Critical) (1) | |
| 8:51:24 | | OSPF Neighbor State Change (CRS Major) (2) | |
| 8:52:13 | | LAG Down (TOA Major) (0) | |
| 8:53:38 | SNMP_TRAP_LINK_UP (TOA xe-1/0/84 traps and syslogs) (3) | | |
| 8:53:46 | Link up (CRS ifindex 1061; TenGigE2/10/0/14) | | |
| 8:53:47 | SNMP_TRAP_LINK_UP (TOA ae6 traps and syslogs) (3) | | |
| 8:53:48 | Link up (CRS ifindex 1411; Bundle-Ether4044) | | |
| 8:53:48 | mplsLdpSessionUp (CRS) | | |
| 8:53:49 | jnxLdpSesUp (vPE) (4) | | |
| 8:53:49 | Neighbor State Change (vPE Up) | | |
| 8:53:49 | Neighbor State Change (CRS Up) | | |
| 8:53:49 | | LAG Down (TOA Clear) (3) | |
| 8:53:49 | | MPLS LDP Session Up (vPE Normal) (4) | |
| 8:54:10 | Neighbor State Change (vPE Up) | | |
| 8:54:11 | Neighbor State Change (CRS Up) | | |
| 8:57:30 | (SNMP polling) | | |
| 8:58:37 | | CISCO to JUNIPER failrure (CRS Critical) | MPLS LDP Session Down (Major) |
| 8:58:52 | (SNMP polling) | CISCO to JUNIPER failrure (CRS Critical) | |

FIG. 1F

E1 = candidate parent event (PE)
ES = {E1, E2,...,Ei}

NETWORK FAULT ORIGINATOR IDENTIFICATION FOR VIRTUAL NETWORK INFRASTRUCTURE

BACKGROUND

Software-defined networking ("SDN") is an architectural framework for creating intelligent networks that are programmable, application aware, and more open. SDN provides an agile and cost-effective communications platform for handling the dramatic increase in data traffic on carrier networks by providing a high degree of scalability, security, and flexibility. SDN can provide several benefits. For example, SDN can allow for the creation of multiple virtual network control planes on hardware that collectively comprise network infrastructure. SDN can help extend service virtualization and software control into many existing network elements. SDN can enable applications to request and manipulate services provided by the network and to allow the network to expose network states back to the applications. SDN can be implemented with user-defined network cloud ("UDNC") strategic objectives that include exploiting the economic advantages of running network functions on existing hardware platforms of the network by using cloud technology to manage resources elastically based upon business and technical policies. Services can be designed, created, deployed, and managed in near-real time, rather than requiring software development cycles to create or modify services. Enhanced Control, Orchestration, Management, and Policy ("ECOMP") is a framework that provides service creation and operational management of UDNC. ECOMP enables significant reductions in network resource usage, which in turn can decrease the time and cost required to develop, deploy, operate, and retire products, services, and networks.

User-defined, on-demand cloud services and user digital experience expectations are driving planning and deployment of network functional virtualization and service-centric SDN among global telecommunications service providers. Network Virtualization Platforms ("NVPs") are deployed in information technology ("IT") data centers, network central offices, and other network points of presence ("POPs") to accelerate deployment of on-demand user service and virtualized network functions, which can be managed via ECOMP. An NVP is a shared virtualized infrastructure that supports multiple services and network applications (including real-time and non-real-time applications). Combining SDN and NVP functionality can provide a highly complex and dynamic set of relationships between virtual, logical, and physical resources.

In some situations, network faults can occur within the virtualized and/or non-virtualized portions of network infrastructure. Conventional mechanisms for handling network faults rely on the separation between alarm analytics produced by a team of systems engineers and network ticket analytics produced by a software team, which can be referred to as a RUBY team, that handles aspects of network infrastructure that operate using a static rule-based alarm processing engine using RUBY. Significant challenges can arise during the transition from a purely non-virtualized computing architecture a virtualized and non-virtualized computing architecture. Specifically, an alarm storm can occur within network elements using RUBY with no clear indication as to the cause. This can lead to time-consuming manual data retrieval and delayed analytics by the RUBY team. Moreover, conventional systems fail to provide a mechanism for measuring how well alarm analytics are functioning, much less how well alarm analytics produced by the system engineers perform to support network ticket operations. Therefore, conventional approaches to addressing network faults will not scale up in the highly virtualized, real-time, and dynamic environments of SDN, NVP, and UDNC.

SUMMARY

The present disclosure is directed to network fault originator identification for virtual network infrastructure. According to one aspect of the concepts and technologies disclosed herein, a system is disclosed. In some embodiments, the system can include a processor and a memory. The memory can store computer-executable instructions that, when executed by the processor, cause the processor to perform operations. In some embodiments, the operations can include determining a network fault condition associated with network infrastructure based on a source ticket. The network infrastructure can include a virtual network function, a physical network function, and a network interface. The operations can include identifying, from the source ticket, a trap set and an alarm set that are associated with origination of the network fault condition. The operations can include collecting network event data from the network infrastructure. In some embodiments, collecting the network event data can occur prior to a polling time of a fault reporting schedule. The network event data can include instances of a simple network management protocol trap and a simple network management protocol alarm. In some embodiments, a trap and/or an alarm can be created by a fault management system based on a fault reporting schedule. The operations can further include determining that a qualified source ticket should be created. In some embodiments, determining that the qualified source ticket should be created can be based on building a root cause correlation information model. The operations can further include generating the qualified source ticket based on the network event data. In some embodiments, the qualified source ticket can be generated prior to an event collector and/or a connectivity monitor tool reporting a connectivity loss within the network infrastructure. In some embodiments, the operations can further include creating a network ticket delta indicator based on the qualified source ticket, and joining the qualified source ticket to an original ticket database. In some embodiments, the operations can include providing the network ticket delta indicator to a ticket delta application executing on a user equipment.

According to another aspect of the concepts and technologies disclosed herein, a method is disclosed. The method can include determining, by a control system communicatively coupled with network infrastructure, a network fault condition associated with the network infrastructure based on a source ticket. In some embodiments, the network infrastructure can include a virtual network function, a physical network function, and a network interface. The method can further include identifying, by the control system from the source ticket, a trap set and an alarm set that are associated with origination of the network fault condition. The method can include collecting, by the control system, network event data from the network infrastructure prior to a polling time of a fault reporting schedule. The network event data can include instances of a simple network management protocol trap and a simple network management protocol alarm. The method can also include determining that a qualified source ticket should be created. In some embodiments, determining that the qualified source ticket should be created can be based on building a root cause correlation information model. The method can further include generating the qualified source ticket based on the network event data. In some embodiments, the qualified source ticket can be generated prior to an event collector and/or a connectivity monitor tool reporting a connectivity loss within the network infrastructure. In some embodiments, the method can further include creating, by the control system, a network ticket delta indicator based on the qualified source ticket; and joining, by the control system, the qualified source ticket to an original ticket database. In some embodiments, the method can further include providing, by the control system, the network ticket delta indicator to a ticket delta application executing on a user equipment.

According to yet another aspect, a computer storage medium is disclosed. The computer storage medium can have computer-executable instructions stored thereon. When the computer-executable instructions are executed by a processor, the processor can perform operations. In some embodiments, the processor can be included in a control system. In some embodiments, the operations can include determining a network fault condition associated with network infrastructure based on a source ticket. The operations also can include identifying, from the source ticket, a trap set and an alarm set that are associated with origination of the network fault condition. The operations also can include collecting network event data from the network infrastructure prior to a polling time of a fault reporting schedule. The network event data can include instances of a simple network management protocol trap and/or a simple network management protocol alarm. The operations can further include determining that a qualified source ticket should be created. In some embodiments, determining that the qualified source ticket should be created can be based on building a root cause correlation information model. The operations can further include generating the qualified source ticket based on the network event data. In some embodiments, the qualified source ticket can be generated prior to an event collector and/or a connectivity monitor tool reporting a connectivity loss within the network infrastructure. The operations can further include creating a network ticket delta indicator based on the qualified source ticket, and joining the qualified source ticket to an original ticket database. The operations can also include providing the network ticket delta indicator to a ticket delta application executing on a user equipment.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1D is a block diagram illustrating an example source ticket that can be implemented according to various embodiments disclosed herein.

FIG. 1E is a block diagram illustrating aspects of a trap and an alarm that can be implemented according to an illustrated embodiment of the concepts and technologies disclosed herein.

FIG. 1F is a block diagram illustrating a visual representation of associations and patterns between traps, alarms, and a ticket according to an illustrated embodiment.

DETAILED DESCRIPTION

Figure 1A:
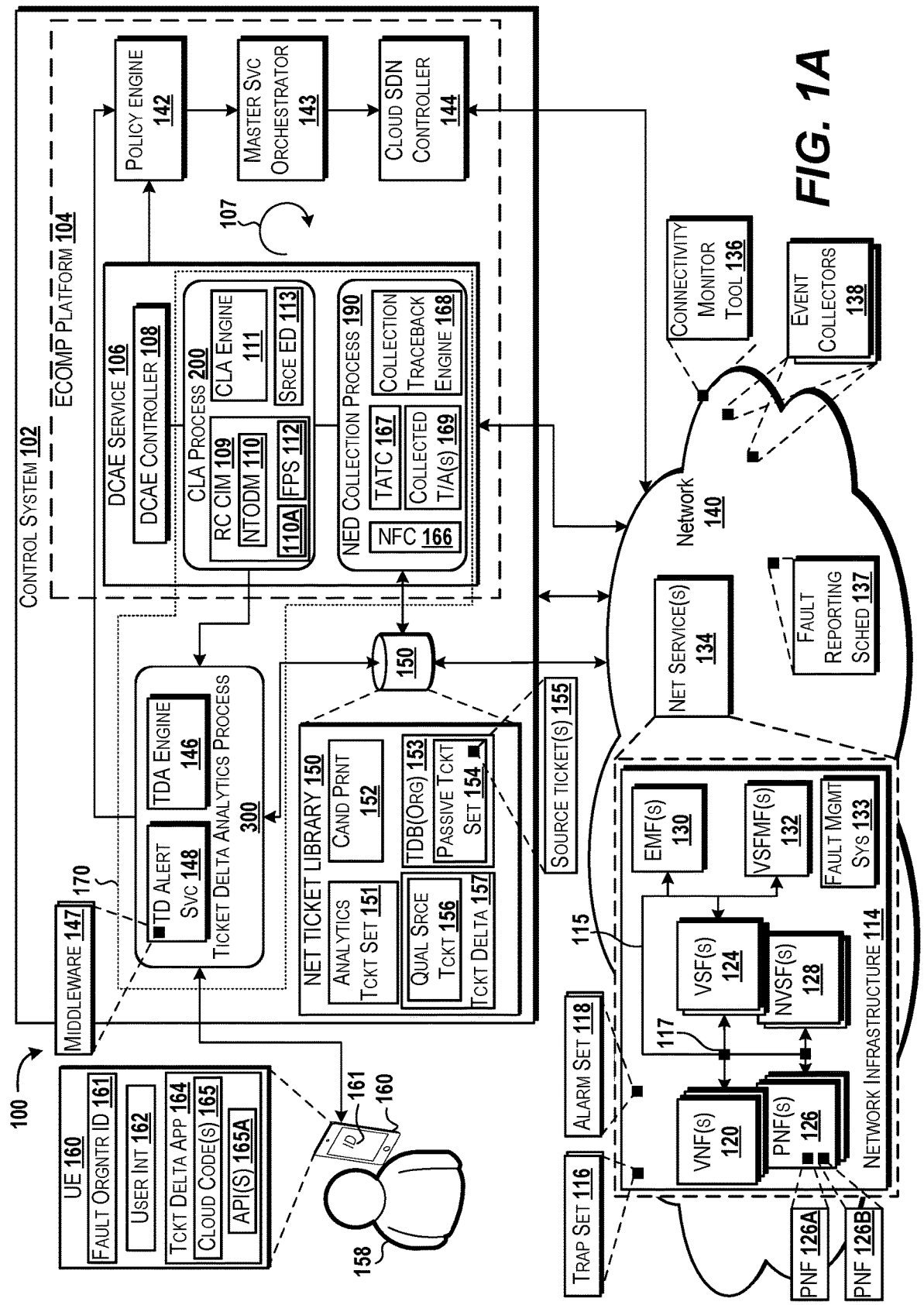
FIG. 1A is a block diagram illustrating aspects of an example operating environment for network fault originator identification that can implement various embodiments of the concepts and technologies described herein.

The following detailed description is directed to network fault origination identification for virtualized network infrastructure. Conventionally, network event monitoring and analytics is performed on a periodic basis using teams of engineers. As network services transition from purely hardware-based to a virtual infrastructure, certain network elements may indicate that a network event has occurred but may not indicate which device is the source or "root" of the network event. Additionally, conventional systems provide network tickets that are statically established and provisioned in different layers of a compute, store, network, and management infrastructure. When the network infrastructure becomes more complex, such as with the introduction of virtualized network functions and virtualized service functions, there is the potential for tens of millions of network events to occur every hour, which can quickly consume the processing capacity of conventional systems to drill down and verify the true root cause of problems and network anomalies detected in both the virtual and physical network domains.

Thus, concepts and technologies disclosed herein are directed to the dynamic analysis and creation of qualified source tickets that allow for real-time identification of one or more root causes and network fault origination within a virtualized network infrastructure. According to embodiments of the concepts and technologies disclosed herein, network elements (e.g., virtualized network functions, physical network functions, virtualized service functions, non-virtualized service functions, etc.) may experience a network fault event, such as for example, connectivity loss, link failure, insufficient resource processing capacity, corrupt memory sector, or the like. The network infrastructure can have a fault monitoring system that includes network elements to detect such events, such as event collectors and/or connectivity monitoring tools. Conventionally, when a network fault event occurs, a trap will be created by one or more network elements that are affected by the network fault event, such as network elements that are upstream and/or downstream of the device and/or experiencing the event. A trap is an event message that indicates a type of network fault event has occurred. For example, if a virtualized network function (e.g., a virtual router) is connected to multiple physical network functions (e.g., two or more core routers) and the virtualized network function malfunctions (e.g., by going offline), then each of the physical network functions may generate a trap and report the network fault event to a fault management system. In various embodiments, the network elements that monitor for network events, problems, and anomalies (e.g., the fault monitoring system, event collectors, connectivity monitoring tools) may adhere to a fault reporting schedule to report when a trap, an alarm, and/or a ticket should be generated and/or reported to a database. For example, a fault management system may generate an alarm based on the traps and report the root cause (e.g., the virtual router failing) at a time dictated by a fault reporting schedule (e.g., 20 minutes after the network fault event occurred). Additionally, a connectivity monitor tool that is upstream from the network element experiencing the fault (e.g., the virtual router) may detect the network fault event and report a connectivity loss later than the traps and alarms reported by the fault management system (e.g., 30 minutes after the event occurred), and thus the database may receive multiple traps, alarms, and/or tickets for the same network fault event based on a designated fault reporting schedule that applies to one or more network elements that report faults (e.g., the fault monitoring system, event collectors, connectivity monitoring tools). The traps, alarms, and/or tickets that are reported statically according to the fault reporting schedule may be collected in a passive ticket set of a database that is communicatively coupled to the network infrastructure.

Embodiments of the present disclosure provide a control system that can access existing tickets of the passive ticket set so as to analyze and learn the differing types of network fault events indicated by the various traps and alarms. The control system can execute a network event data collection process to collect traps and alarms prior to and/or independent of the fault reporting schedule, determine associations and event sequences via a closed loop analytics process to identify one or more root causes of the network events, and create one or more qualified source tickets that can be used to supplement the passive ticket set so as to allow for access and determination of root causes within seconds after a network fault event is received by the fault management system. The control system can inform a network systems user of a potential cause of a network fault event via a ticket delta alert service that identifies when a qualified source ticket is appended to the passive ticket set and can send a message to a ticket delta application executing on a user equipment as to a possible fault originator identification associated with the network fault event. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and other particularized, non-generic machines.

Referring now to FIG. 1A, aspects of an operating environment 100 for implementing various embodiments of the concepts and technologies disclosed herein for network fault originator identification will be described, according to an illustrative embodiment. The operating environment 100 shown in FIG. 1A includes a computing system that can host a network control framework (hereinafter referred to as a "control system") 102. The control system 102 can operate on, in communication with, and/or as a part of a communications network ("network") 140. Briefly, it should be understood that the network 140 can include almost any type of computer networks as well as communications networks. The network 140 can be hosted, in part or in whole, by a communications service provider. The network 140 can include one or more of a radio access network, an evolved packet core network, a core network, an IP-based network, a transport network, a circuit switched network, a mobile Wide Area Network, a combination thereof, or the like. The network 140 can host one or more instances of network services 134. The network services 134 can include communication services, compute services, storage services, routing services, switching services, relay services, and/or other virtualized or non-virtualized network service. It should be understood that the term "service" should be construed as one or more executing applications that can provide a set of communication and/or network functions on behalf of the network 140, and therefore the term "service" is not used, and should not be construed, to invoke any abstract idea or judicial exception. The network services 134 can be used by a service provider, by third parties, and/or by customers via user equipment, servers, and/or other computing systems.

The network 140 can include, and/or be communicatively coupled with, a network infrastructure 114. The network infrastructure 114 can include one or more instances of physical network functions ("PNFs") 126 that can be selected and/or activated from an available inventory of physical network resources. In some embodiments, the PNFs 126 can include, for example without limitation, one or more instances of a hardware router, switch, firewall, load balancer, session border controller, route reflectors, physical network interface control driver, or other physical network elements. In some embodiments, the PNFs 126 can conform to an industry specification, such as for example, one or more PNFs discussed by the European Telecommunications Standards Institute. The network infrastructure 114 also can include one or more instances of virtual network functions ("VNFs") 120 that can be supported by one or more of the PNFs 126 via the use of, for example, a virtual machine ("VM") and/or a hypervisor. Examples of the VNFs 120 can include, but should not be limited to, virtual switches, virtual routers, virtualized routing functions, a virtual tap, a virtual network interface controller, a virtual storage device, a virtual server, or the like. Because the network infrastructure 114 can include other types of functions, it should be understood that these examples are provided for illustration purposes only, and therefore should not be construed as limiting in any way.

The network infrastructure 114 also can include one or more network interfaces 117 that can communicatively couple elements within the network infrastructure 114 to the network 140 and/or the control system 102. The network infrastructure 114 can include one or more virtualized service functions ("VSFs") 124, one or more non-virtualized service functions ("NVSFs") 128, one or more element management functions ("EMFs") 130, and/or one or more virtual service function management functions ("VSFMFs") 132. The VSFs 124 can include one or more network services, such as IP-based call functions, that are virtualized and provide one or more communication, storage, and/or processing capabilities for the network infrastructure 114. The NVSFs 128 can include hardware-based service functions that execute on the PNFs 126, such as but not limited to, load balancing, network security, resource monitoring, or the like. The EMFs 130 can be configured to manage various fault, configuration, accounting, performance, and security capabilities of the elements within the network infrastructure 114, such as the NVSFs 128 and/or the PNFs 126. The VSFMFs 132 can manage and control the amount of, and types of, VSFs 124 operating within the network infrastructure 114. Each of the network elements (e.g., the VNFs 120, the PNFs 126, the VSFs 124, the NVSF 128, the EMFs 130, and/or the VSFMFs 132) can be communicatively coupled to each other, the network 140, and the control system 102 via one or more communication links 115. Examples of the communication link 115 can include a fiber optic link, an open shortest path first link, a border gateway protocol link, a multiprotocol label switching link, or other wired and/or wireless communication link.

The network infrastructure 114 also can include a fault management system 133. The fault management system 133 can communicate with any of the network elements within the network infrastructure 114, the network 140, and/or the control system 102. In various embodiments, the fault management system 133 can detect, monitor, and/or report network fault events that occur within the network infrastructure 114. Examples of network fault events can include, but should not be limited to, a malfunction or failure of one or more of the VNFs 120 (e.g., a virtual router going offline), a network interface failure (e.g., one or more network interfaces 117 failing to communicate), a severed connection (e.g., one or more of the communication links 115 being cut or severed), and/or a PNF 126 operating outside of parameters (e.g., exceeding maximum allowed bandwidth and/or exceeding a maximum allowed processor utilization amount). It is understood that a network fault event may correspond with one or more of a network failure and/or an occurrence of a network situation that triggers an alert or flag to be generated. When a network fault event occurs to one or more network elements (e.g., one or more of the PNFs 126, the VSFs 124, the network interfaces 117, the NVSFs 128, etc.) within the network infrastructure 114, a network trap ("trap") can be generated. A trap can take the form of a message that is generated by one or more devices that experience and/or are affected by the network fault event. Multiple instances of a trap can be generated by distinct devices or functions (e.g., one or more VNFs 120 and/or PNFs 126) based on the same network fault event. It is understood that multiple network fault events may occur, where one network fault event is the root cause of the occurrence of other network fault events. As such, multiple traps may be associated with each other based on one or more network elements being upstream or downstream from a device or service that originated the fault. In some embodiments, one or more traps can be compiled into a trap set 116. Multiple instances of the trap set 116 can exist within the network infrastructure 114 and be stored in a memory storage device. In some embodiments, one or more instances of the trap set 116 can be grouped together based on a similar fault type or other association.

In various embodiments, one or more network elements may create an alarm based on the generation of one or more traps and occurrence of a network fault event. For example, in an embodiment, a first PNF 126A and a second PNF 126B (which may have both PNFs 126 embodied as a core router) may experience a link failure which is a result of communication links being cut (e.g., multiple fiber optic links). The link failures would be network fault events, and due to the network fault events, an instance of a VNF 120 (e.g., a virtual router) may generate multiple link failure traps that are sent to the fault management system 133. In some embodiments, the traps and/or the alarms may be reported to the fault management system 133 according to a fault reporting schedule 137, which may define how often traps and/or alarms are to be reported to the fault management system 133. For example, the link failure traps may be sent to the fault management system 133 fifteen minutes after the network fault event occurred. Additionally, each of the PNFs 126A, 126B may be executing fault monitoring logic that creates one or more alarms based on the link failure traps. In some embodiments, a connectivity monitor tool 136 may monitor the network 140 and/or the network infrastructure 114 for network fault events that have not yet been reported to the fault management system 133. In some embodiments, the connectivity monitor tool 136 may detect that other network elements within the network infrastructure 114 lost connection with the VNF 120 that suffered connection loss with the PNFs 126A, 126B. Thus, the connectivity monitor tool 136 may send one or more additional alarms to the fault management system 133 later in time than the traps and alarms reported by the network elements themselves (e.g., thirty minutes after occurrence of the network fault event).

In some embodiments, one or more alarms may be compiled, combined, and/or associated with each other into an alarm set 118. In some embodiments, the alarm set 118 and the trap set 116 may have shared characteristics that can be used to determine a root cause, as will be discussed below. Additional discussion of contents found in an alarm of the alarm set 118 and a trap of the trap set 116 will be provided below with respect to FIG. 1E. In some embodiments, one or more event collectors 138 can be used to collect and/or report traps and/or alarms to the fault management system 133 and/or the control system 102. In some embodiments, the fault management system 133 can create a network ticket based on one or more traps and/or alarms. An example of an embodiment of a network ticket will be discussed below with respect to the control system 102 and with respect to FIG. 1D. An alarm of the alarm set 118 can be created based on receiving one or more traps, and the alarm can include a message that describes a fault situation (e.g., a link down) that was triggered by and correlated with one or more traps. A ticket, such as one or more source tickets 155, can include a data array structure that describes a complete hierarchy of correlated alarms, representing a single specific fault situation with text that indicates a level of resolution and the indicated fault that should be resolved. Further discussion and example embodiments of traps, alarms, and tickets will be discussed with respect to FIGS. 1D, 1E, and 1F. In some embodiments, a network fault event may be described by a data field labeled fault situation, whereas a ticket may describe a network fault event by a data field labeled fault condition. It is understood that the examples provided are for illustration purposes only, and therefore should not be construed as limiting the scope of the disclosure. Additional aspects of the network 140 are illustrated and described below with reference to FIG. 6.

According to various embodiments, the control system 102 can integrate an enhanced control, orchestration, management, and policy framework platform (hereinafter referred to as an "ECOMP platform") 104, which can be supported by one or more compute, storage, and network resources of the control system 102. It is understood that the compute, storage, and network resources of the control system 102 can include a processor, a memory, a network interface, and other computing resources, such as discussed with respect to FIG. 4. The ECOMP platform 104 can enable rapid service creation and management, while also allowing for real-time and/or near-real time analysis of network event data and network tickets. The ECOMP platform 104 also can dynamically adapt to surges in network faults through elastic capacity management by enabling additional computer, storage, and network resources (e.g., by executing an additional processor, processor core, memory sector, memory device, etc.) for scaling and instantiation of tickets within the network 140. The ECOMP platform 104 also can support dynamic network event monitoring without adhering to a static fault reporting schedule, and can support alarm and ticketing analysis through trap-alarm-ticket closed loop analytics. As illustrated in FIG. 1A, the ECOMP platform 104 can be a single element of the control system 102, however this may not be the case in every embodiment. It should be understood that these examples are provided for illustrative purposes only, and therefore should not be construed as limiting in any way.

In some embodiments, the ECOMP platform 104 can provide real-time ticket analytics and root cause identification functions through a series of processes and software modules. These capabilities can be referred to as "trap-alarm-ticket closed loops", which is illustrated as a semi-circular arrow for a trap-alarm-ticket closed loop 107. The trap-alarm-ticket closed loop 107 can be based on information and network event data (e.g., traps from the trap set 116, alarms from the alarm set 118, and any tickets in a network ticket library 150, which will be discussed below) that is collected and analyzed by a data, collection, analytics, and events ("DCAE") service 106. The DCAE service 106 can include a DCAE controller 108 that is configured to activate, manage, and control the execution of a network event data collection process 190 (also referred to herein as "method 190") and a closed loop analytics process 200 (also referred to herein as "method 200"). The DCAE controller 108 can operate as the "brain" of the DCAE service 106 to invoke monitoring and facilitate operations of other instances of DCAE modules so as to ensure that performance parameters are met, detect errors, perform root cause analytics and ensure rapid dissemination of potential root cause information to network operators. The DCAE service 106 can provide information to a policy engine 142, which can apply and/or enforce service scope policies, infrastructure policies, down-time policies, capacity policies, and/or other operational network policies that provide parameters and thresholds to network infrastructure so as to further identify potential and current network faults within the network infrastructure 114.

The ECOMP platform 104 can include a master service orchestrator 143 that can serve as an operations management controller to assist in the instantiation and/or modification of network services, such as the network services 134. The master service orchestrator 143 can handle messages and interact with the DCAE service 106 for analysis of the network services 134 and network event data related to the network infrastructure 114. The master service orchestrator 143 can interact with a cloud SDN controller 144, which can be communicatively coupled to the network 140. The cloud SDN controller 144 can communicate with network elements within the network infrastructure 114 so as to manage assets of the network infrastructure 114. The cloud SDN controller 144 can interact with the network infrastructure 114 so as to instantiate virtual resources (e.g., one or more VNFs 120, VSFs 124, and/or VSFMFs 132) and/or to allocate hardware resources (e.g., one or more PNFs 126 and/or NVSFs 128) that can host various service and/or network functions as illustrated and described herein. The cloud SDN controller 144 can implement one or more policies on behalf of the policy engine 142 and according to instructions from the master service orchestrator 143 so as to support the DCAE service 106 in trap-alarm-ticket closed loop analytics. It is understood that one or more SDN application programming interfaces may be employed among and/or between the control system 102 and the network infrastructure 114 for communication and data access.

The DCAE controller 108 can interact with and activate the network event data collection process 190 via a collection traceback engine 168. The network event data collection process 190 can be executed to collect network event data and tickets for analysis in order to determine which network fault events correspond with various network elements, thereby providing a quicker and more efficient use of processing resources in identification of fault origination. The collection traceback engine 168 can create instructions to access the network ticket library 150 and the network 140. In various embodiments, the collection traceback engine 168 can instruct one or more of the event collectors 138 to retrieve network event data, such as one or more traps from the trap set 116 and/or alarms from the alarm set 118, which can be stored in memory as the collected network event data (e.g., collected traps and alarms) 169. In various embodiments, the collection traceback engine 168 can retrieve tickets from the network ticket library 150, such as one or more of the source tickets 155 from a passive ticket set 154 of an original ticket database 153 stored in the network ticket library 150. The source tickets 155 can be created in a passive manner based on alarms that are statically reported via the fault reporting schedule 137. One or more source tickets 155 can be used by the DCAE service 106 to learn what information is provided by the network event data, as well as possible commonalities and associations that may appear amongst different source tickets 155. A source ticket, such as the source ticket 155, is a network ticket that points to a root cause of a fault situation indicated in an alarm and/or a network fault event indicated in a trap. In various embodiments, the collection traceback engine 168 can identify one or more network fault condition 166 from one or more of the source tickets 155, and use the network fault condition 166, along with other information included in the network ticket library 150, to create a set of trap-alarm-ticket criteria 167 that identifies the type of network event data (i.e., traps and alarms) that should be collected based on shared characteristics indicated in the trap set 116 and the alarm set 118. The DCAE service 106, via use of at least the collection traceback engine 168, can identify potential relationships between traps, alarms, and tickets. For example, a trap within the trap set 116 can include a data packet that describes a network fault event occurrence from one or more devices, services, and/or functions and may be generated in real-time or near real-time. Thus, the collection traceback engine 168 can allow for network event data to be collected based on an association between one or more of a ticket, an alarm, and a trap. It is understood that the examples provided are for illustration purposes only, and therefore should not be construed as limiting the scope of the disclosure.

The DCAE controller 108 also can interact with a closed loop analytics engine 111 that executes the closed loop analytics process 200. The closed loop analytics engine 111 can analyze source event data 113 that is extracted from the one or more source tickets 155 of the passive ticket set 154. The source event data 113 can include the information that is associated with, and can be extracted from, one or more source tickets 155. Examples of the types of information included within the source tickets 155 and the source event data 113 will be discussed with respect to FIGS. 1D and 1E. The closed loop analytics engine 111 can create a root cause correlation information model 109. The root cause correlation information model 109 can include event timing data, event flow information on management objects in a network topology object data model 110, and event correlation rules that can be used to determine whether certain network event data indicates a parent-child relationship within a specified time duration being analyzed and/or indicated by a ticket. The root cause correlation information model 109 can integrate the network topology object data model 110 and a time-sequence diagram 110A so as to determine correlations between sets of network event data. In some embodiments, the closed loop analytics engine 111 can also invoke one or more fault pattern strings 112 that can be used to verify a fault condition that is indicated within a ticket from the network ticket library 150. The closed loop analytics engine 111 can be used during the closed loop analytics process 200 to determine whether a qualified source ticket 156 should be generated. A qualified source ticket 156 is a ticket that is generated using network event data that was collected apart from the fault reporting schedule 137 (e.g., in real-time or near real-time) and has the same fault situation and resolution condition as the one or more tickets (e.g., the source tickets 155) being analyzed in the passive ticket set 154 of the original ticket database 153, where the source tickets 155 that are in the passive ticket set 154 were passively generated in a static and/or periodic manner by the fault management system 133 according to the fault reporting schedule 137. Thus, a qualified source ticket 156 is a ticket that is generated by the ECOMP platform 104 instead of by the fault management system 133, and the qualified source ticket 156 identifies a root cause by using a network resolution condition text that is the same across multiple source tickets 155, as well as by using indications of a parent-child relationship within network event data (e.g., the collected traps and alarms of the collected network event data 169). When determining whether a parent-child relationship exists within one ticket and/or between two or more tickets, the closed loop analytics engine 111 may designate a source ticket 155 and/or instances of network event data within the source ticket 155 (e.g., the source event data 113) to be a candidate parent 152 of another ticket and/or instance of network event data. The candidate parent 152 can be stored as a label, flag, and/or as an instance of a ticket within the network ticket library 150. If a parent-child relationship exists, the closed loop analytics engine 111 can indicate that the particular source ticket and/or instance of network event data is a parent of another source ticket and/or instance of network event data, respectively. Each qualified source ticket within the analytics ticket set 151 can indicate the parent-child relationship that are likely to occur between different network elements within the network infrastructure 114 when a particular network fault event occurs. In various embodiments, each qualified source ticket can include patterns, associations, correlations, and other pointers that link a fault event described in a network fault condition field to one or more traps, such as shown in the illustration in FIG. 1F. Once a qualified source ticket is generated, the qualified source ticket is added and/or compiled in an analytics ticket set 151, which in turn can be added, appended, or otherwise correlated with the passive ticket set 154 so as to supplement the original ticket database 153 and allow for predictive operations to occur. Thus, the qualified source ticket 156 can account for associations using multi-variate commonalities between various traps, alarms, and source tickets 155 such that the analytics ticket set 151 can be applied in a predictive manner instead of the reactive manner in which the passive ticket set 154 is created (via the fault management system 133). As such, when a new network fault event is detected, the control system 102 does not need to wait for the fault management system 133 to create a ticket, but rather, the control system 102 can collect the network event data (e.g., traps and alarms) before the fault management system 133 generates a ticket for this new network fault event, and can query one or more qualified source tickets 156 using the collected network event data to identify a root cause and identification of a device and/or service that originated the network fault, thereby decreasing the query time spent in identifying a root cause due to avoidance of searching through the thousands of source tickets 155. Further discussion of the closed loop analytics process 200 is provided below with respect to FIGS. 2A-2F.

The control system 102 can include the network ticket library 150 that can store various ticket sets which may be reactive oriented or predictive oriented. For example, the network ticket library 150 can include the original ticket database 153 that has the passive ticket set 154 which includes source tickets 155. The creation and analysis using the passive ticket set 154 is reactive oriented due to the source tickets 155 being generated according to the fault reporting schedule 137, which dictates that tickets be created in a non-real-time manner. Thus, the passive ticket set 154 comprises the source tickets 155 that are delayed from real-time, thus leading to reactive-oriented analysis. In contrast, the DCAE service 106 can create the analytics ticket set 151 that includes one or more qualified source tickets 156 that can be generated apart from the fault reporting schedule 137 using collected network event data, such as traps and alarms that are obtained in real-time or near-real-time (e.g., in response to being detected by one or more event collectors and/or as traps or alarms are being sent from the network elements within the network infrastructure that generated the traps or alarms). Thus, the analytics ticket set 151, through the use of one or more qualified source tickets 156, can enable predictive analytics that reduce processor burden through shortened query time and faster identification or the device or service that is the root cause or originator of the network fault event. It is understood that the network ticket library 150 can include memory resource(s) and can include one or more hardware components that perform storage operations, including temporary or permanent storage operations. In some embodiments, the memory resource(s) include volatile and/or non-volatile memory implemented in any method or technology for storage of information such as computer readable instructions, data structures, program modules, or other data disclosed herein. It is understood that, as used in the claims, any reference to the network ticket library 150 should not be construed as encompassing signals per se.

The control system 102 also can include a ticket delta analytics process 300 (also referred to herein as the "method 300") that is supported by a ticket delta analytics engine 146. The ticket delta analytics engine 146 can perform ticket delta analytics to identify a delta (i.e., a difference) between the source tickets 155 of the passive ticket set 154 existing within the original ticket database 153 and one or more qualified source tickets 156 that are generated via the closed loop analytics engine 111, such as via the closed loop analytics process 200. When the ticket delta analytics engine 146 determines that a generated qualified source ticket 156 is not available for query within the original ticket database 153 (similar to how the source tickets 155 of the passive ticket set 154 are available for query), the ticket delta analytics engine 146 can create a ticket delta indicator 157, which may be stored within the network ticket library 150. Each instance of the ticket delta indicator 157 can correspond with the number of qualified source tickets 156 and can be made available for query in the original ticket database 153. One or more of the qualified source tickets 156 can make up the analytics ticket set 151 and enable predictive network fault origination identification capability, as well as provide for near real-time alerts via a ticket delta alert service 148. It is understood that the use of one-way arrows, such as illustrated in FIG. 1A, may indicate an embodiment having uni-directional communication flow, however the uni-directional communication flow is for illustrative purposes only and should not limit other embodiments. It is understood that alternate embodiments of the present disclosure can replace one-way arrows (indicating unidirectional communication flow links) with two-way arrows (indicating bi-directional communication flow links), and vice-versa. As such, the examples provided herein are for illustration purpose only, and therefore should not be construed as limiting the scope of embodiments according to the concepts and technologies discussed herein.

The ticket delta analytics engine 146 can communicatively couple with the ECOMP platform 104, such as to the DCAE controller 108 and the closed loop analytics process 200, and the network ticket library 150. In some embodiments, the ticket delta analytics engine 146 can support the ticket delta alert service 148. The ticket delta alert service 148 can provide an interface for one or more user equipment, such as the user equipment 160, to receive alerts that a new qualified source ticket has been created and that indicate root causes associated with network fault events that are detected within the network infrastructure 114. The ticket delta analytics engine 146 can execute via one or more virtual and/or physical hardware resources of the control system 102 in order to support the ticket delta alert service 148. The ticket delta alert service 148 can include a middleware system 147 that allows for the user equipment 160 to access information from the control system 102. In some embodiments, the middleware system 147 can have a representational state transfer ("RESTful") architecture that makes use of standards, notations, and/or schemes such as, but not limited to, Hypertext Transfer Protocol ("HTTP"), a Uniform Resource Identifier ("URI") scheme, JavaScript Object Notation ("JSON"), Extensible Markup Language ("XML"), or the like. The user equipment 160 can include a user interface 162 and a ticket delta application 164 that is stored in a memory of the user equipment 160 and executed by a processor. The ticket delta application 164 can include an application programming interface ("API") 165A that is configured to interface with the middleware system 147 of the ticket delta alert service 148 of the control system 102. In some embodiments, the ticket delta application 164 can provide a browser that is presented on the user interface 162 and can interact with a set of cloud codes 165 that correspond with the particular language, protocol, notation, scheme, and/or standards of the middleware system 147 so as to enable the user equipment 160 to receive and/or access information from the control system 102, such as one or more qualified source tickets 156 from the analytics ticket set 151 and/or a fault originator identification 161. In some embodiments, the cloud codes 165 may dynamically instantiate one or more API 165A so as to access one or more of the qualified source tickets 156 as they are added to the network ticket library 150.

The user equipment 160 can be associated with a user 158 of a systems engineering team that manages the event monitoring, alarm analytics, and network ticketing. In some embodiments, the ticket delta application 164 can display a fault originator identification 161 corresponding to the particular device, service, and/or function from the network infrastructure 114 that is indicated as being the root cause and originator of the network fault event detected within the network infrastructure 114 apart from the fault reporting schedule 137. For example, in an embodiment where the second PNF 126B (e.g., a core router) goes offline, thereby causing one of the VNFs 120 (e.g., a virtual router) and multiple VSFs 124 to independently generate traps, which in turn cause a plurality of alarms to be triggered by the fault management system 133, the control system 102 can perform real-time predictive closed loop analytics via processes discussed herein in order to generate and/or query for a qualified source ticket 156, which can direct the DCAE controller 108 to identify the root cause of the plurality of detected network events to be the second PNF 126B, which may correspond with the fault originator identification 161. In some embodiments, the fault originator identification 161 can be included within one or more of the qualified source ticket 156 of the analytics ticket set 151, however this may not be the case in every embodiment. In some embodiments, the qualified source tickets 156 of the analytics ticket set 151 may direct the DCAE controller 108 to a specific type of network element within the network infrastructure 114 that would be the root cause and originator of the plurality of network fault events that led to multiple traps, alarms, and/or tickets being generated.

The control system 102 can implement the network event data collection process 190, the closed loop analytics process 200, and the ticket delta analytics process 300 in an iterative, cyclical, and/or ongoing manner, and in some embodiments may be encompassed within a trap-alarm-ticket closed loop analytics data model 170. Further details of the trap-alarm-ticket closed loop analytics data model 170 will be discussed below with respect to FIG. 1B. It is understood that the control system 102 can be supported by one or more instances of compute resources. The compute resource(s) can include one or more particular hardware devices that perform computations to process data, and/or to execute computer-executable instructions of one or more application programs, operating systems, and/or other software, including applications that provide access to user equipment 160. The compute resources can include one or more central processing units ("CPUs") configured with one or more processing cores, and/or one or more graphics processing unit ("GPU") configured to accelerate operations performed by one or more CPUs. The compute resources can include one or more system-on-chip ("SoC") components along with one or more other components, including, for example, one or more of the memory resources, and/or one or more of the other resources. In some embodiments, the compute resources are provided by the network infrastructure, however this may not be the case in every embodiment. It is understood that the examples discussed are provided for illustration purposes only, and therefore should not be construed as limiting in any way. Further discussion of the ticket delta analytics process 300 will be provided below with respect to FIG. 3.

FIG. 1A illustrates instances of one control system 102, one ECOMP platform 104, one DCAE service 106, once DCAE controller 108, one policy engine, one master service orchestrator 143, one cloud SDN controller 144, one network event data collection process 190, one network fault condition 166, one trap-alarm-ticket criteria 167, one set of collected network event data 169, one collection traceback engine 168, one closed loop analytics process 200, one closed loop analytics engine 111, one source event data 113, one fault pattern string 112, one root cause correlation information model 109, one network topology object data model 110, one time-sequence diagram 110A, one ticket delta analytics process 300, one ticket delta alert service 148, one middleware system 147, one ticket delta analytics engine 146, one network ticket library 150, one analytics ticket set 151, one candidate parent 152, one qualified source ticket 156, one ticket delta indicator 157, one original ticket database 153, one passive ticket set 154, one source ticket 155, one network 140, one connectivity monitor tool 136, one set of event collectors 138, one fault reporting schedule 137, one set of network services 134, one network infrastructure 114, one trap set 116, one alarm set 118, one set of communication links 115, one set of network interfaces 117, one VNF 120, one PNF 126, one NVSF 128, one VSF 124, one EMF 130, one VSFMF 132, one fault management system 133, one user equipment 160, one fault originator identification 161, one user interface 162, one ticket delta application 164, one set of cloud codes 165, one API 165A, and one user 158. It should be understood, however, that some implementations of the operating environment 100 can include zero, one, or more than one instances of these elements of the operating environment 100 shown in FIG. 1A. As such, the illustrated embodiment of the operating environment 100 should be understood as being illustrative, and should not be construed as being limiting in any way.

Figure 1B:
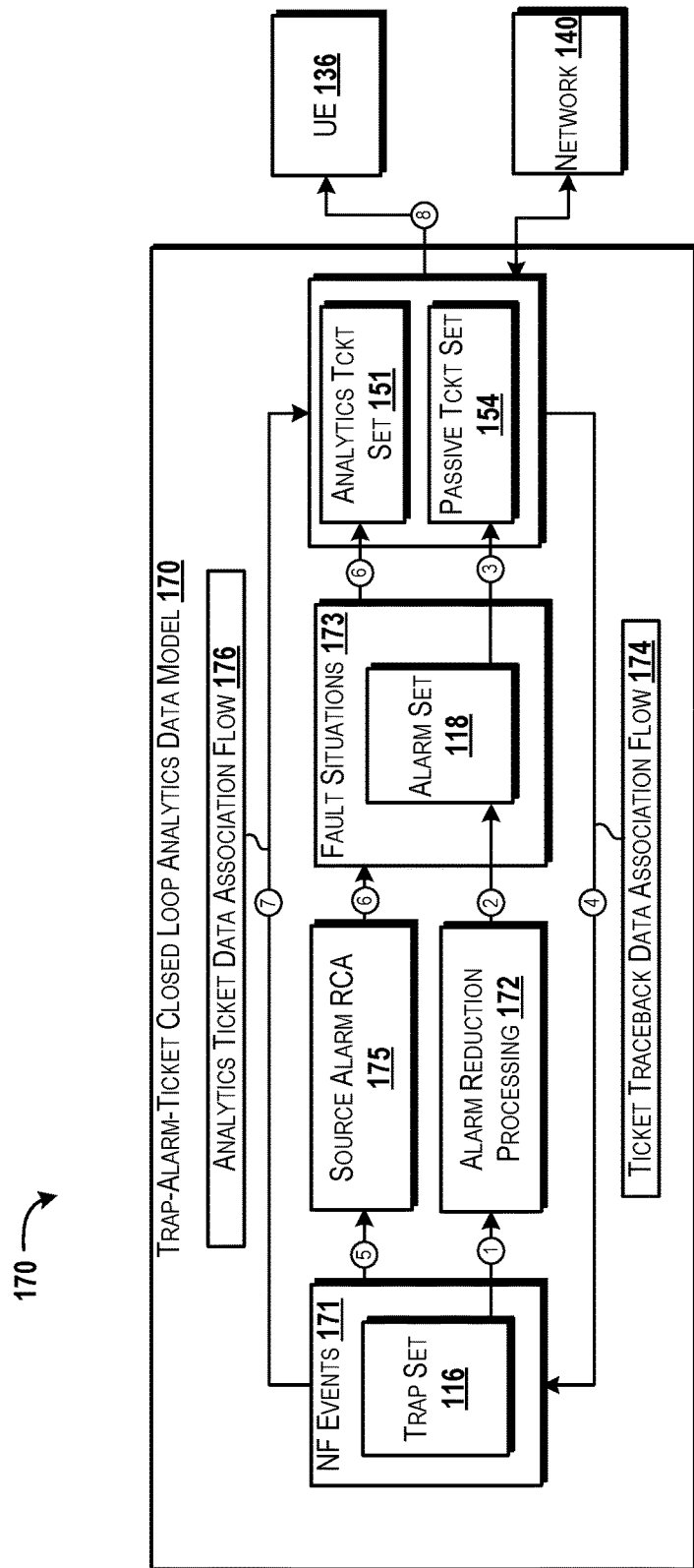
FIG. 1B is a block diagram illustrating aspects of a trap-alarm-ticket closed loop analytics data model for implementing aspects of the concepts and technologies described herein, according to an illustrative embodiment.
Figure 1C:
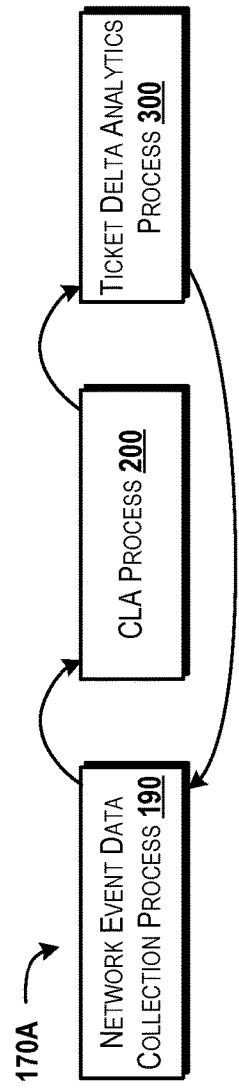
FIG. 1C is a flow diagram illustrating an example process flow, according to an illustrative embodiment of the concepts and technologies disclosed herein.

Turning now to FIGS. 1B and 1C, with continued reference to FIG. 1A, a block diagram illustrating aspects of the trap-alarm-ticket closed loop analytics data model 170 are disclosed, according to an illustrative embodiment. The trap-alarm-ticket closed loop analytics data model 170 can be implemented by the control system 102 as an ongoing, continuous process by which to perform predictive closed loop analytics and decrease the required processing and memory used in identifying and locating the particular devices, services, and/or functions that are the root cause for network fault events. For example, as illustrated in FIG. 1C, a process flow 170A can begin with the network event data collection process 190 being initiated, leading to the closed loop analytics process 200, and then allowing the ticket delta analytics process 300 to occur, which in turn can be repeated. The trap-alarm-ticket closed loop analytics data model 170 can be executed via one or more platforms, engines, and/or controllers of the control system 102, such as but not limited to, one or more of the ECOMP platform 104, the DCAE service 106, the DCAE controller 108, the closed loop analytics engine 111, the collection traceback engine 168, the ticket delta analytics engine 146, and/or other elements of the operating environment 100.

Conventionally, a static rules-based software system designed by a system engineering team may process alarms based on trap information that was collected via static polling according to a fault schedule, such as the fault reporting schedule 137. However, conventional systems may incur duplicate alarms, tickets, and traps that include overlapping duplicitous information, without any mention or identity of a root cause or origination of the corresponding network fault event(s). Thus, conventional systems are limited to reactive ticket sets which can make root cause identification slow and cumbersome. Moreover, the conventional systems fail to provide root cause identification during alarm storms where a plurality of hundreds, thousands, or millions of alarms are generated by network infrastructure within a short period of time, without indication of whether they are related. As such, embodiments of the present disclosure go beyond the conventional systems and can implement the trap-alarm-ticket closed loop analytics data model 170 that enables the identification of tickets that indicate possible root causes due to creation of the analytics ticket set 151 that minimizes alarm processing overhead. As seen in FIG. 1B, the trap-alarm-ticket closed loop analytics data model 170 can transform a reactive ticket dataset (e.g., the passive ticket set 154) into a predictive analytics ticket data set (e.g., via the addition of the analytics ticket set 151 to the passive ticket set 154) that enhances ticketing root cause discovery capabilities, thereby reducing query times of network databases and allowing for quicker identification of fault origination.

In an embodiment, the trap-alarm-ticket closed loop analytics data model 170 can represent a cyclical process by which qualified source tickets 156 within the analytics ticket set 151 are created and queried for identification of network fault events. For example, the ECOMP platform 104 can be used to collect one or more traps from the trap set 116 created by the network infrastructure 114. The ECOMP platform 104 can proceed along the path 1 to begin alarm reduction processing 172, which can occur by the fault management system 133 generating one or more alarms to form the alarm set 118 that is based on one or more traps from the trap set 116. The fault management system 133 may generate one or more source tickets 155 that are passively and/or statically generated and sent to the network ticket library 150 as part of the passive ticket set 154, according to the fault reporting schedule 137. The trap-alarm-ticket closed loop analytics data model 170 can continue along the path 3, where the DCAE service 106 can instruct the collection traceback engine 168 to initiate the network event data collection process 190 to collect one or more source tickets 155 from the passive ticket set 154. The DCAE service 106 can use the collection traceback engine 168 to obtain one or more source tickets 155, which are part of the passive ticket set 154, that are within the original ticket database 153 stored in the network ticket library. The source tickets 155 can include network event data, such as information in traps that was generated based on the occurrence of one or more network fault events, and alarms that were generated based on the occurrence of one or more traps. An example of one source ticket 155 is provided in FIG. 1D, according to an illustrative embodiment. Additionally, an example of information that can be included within traps and alarms is provided in FIG. 1E, according to an embodiment. A brief discussion of FIGS. 1D and 1E are provided, before continuing discussion of FIG. 1B.

Turning briefly to FIG. 1D, information associated with network event data that can be included within the source ticket 155 is illustrated, according to an embodiment. In various embodiments, the source ticket 155 can include a plurality of network event data fields that indicate a variety of information about the one or more alarms and traps that serve as a basis for the generation of the source ticket 155. In some embodiments, the source ticket 155 can include a restore duration field 155A that indicates a time duration that elapsed from the beginning of the device's detection of the network fault event and the remediation of the network fault event. The source ticket 155 can include a ticket state field 155B that indicates whether the source ticket 155 is considered to be "open" (i.e., a resolution has not been found to remedy and/or otherwise ameliorate the network fault) or "closed" (i.e., a resolution has been found and/or course of action has been instructed). The source ticket 155 can include a network resolution condition text field 155C that can indicate a root cause and origination of one or more network fault events that prompted the creation of one or more source ticket 155. The network fault event can be identified in a network fault condition field 155I. In the illustrated example, the network resolution condition text field 155C indicates that a circuit bounce is the root cause of the network fault event, which as illustrated in the example text provided in the network fault condition field 155I, indicates that the network fault event is detected as an MPLS LDP session down flag that is based on a peer notification being sent from a neighboring interface marked "536." Thus, although the network fault condition field 155I can provide details about the network fault event that caused, at least in part, the source ticket 155 to be generated, the network fault condition field 155I may not directly indicate the root cause of the network fault condition. The ECOMP platform 104 may analyze a plurality of tickets and/or fields to determine the single and/or multiple root causes for one or more network fault events indicated by the network fault condition fields. It is understood that the examples provided are for illustrative purposes only, and therefore should not be construed as limiting in any way.

The source ticket 155 can also include a time/date fault reported field 155D that indicates a date and/or time when the network fault event was reported to the fault management system 133 by one or more of the event collectors 138, the connectivity monitor tool 136, and/or any of the network elements themselves of the network infrastructure 114 (e.g., any of the PNFs 126, VNFs 120, etc.). The source ticket 155 also can include a ticket closed date 155E that indicates a date and/or time as to when the source ticket is considered closed due to the root cause being identified and/or otherwise having the network fault event be resolved. The source ticket 155 can include a ticket number field 155F that indicates a unique ticket number associated to a row of the source ticket 155 and/or to the source ticket 155 itself. The source ticket 155 also can include an asset identifier field 155G that indicates a particular identifier of a type of network element within the network infrastructure 114 (e.g., a serial number and/or another number assigned and/or provided to an element of the network infrastructure). The source ticket 155 also can include a network element identifier field 155H that indicates a network device, service, and/or other network element (e.g., any of the PNFs 126, the VNFs 120, the VSFs 124, the NVSFs 128, etc.) that operates within the network infrastructure 114 and experience and/or was affected by a network fault event. The source ticket 155 can include an active organization field 155J that indicates an organization identifier assigned to the network element within the network infrastructure 114. The source ticket also can include a work queue field 155K that indicates which maintenance ticket queue the specific ticket is assigned within the fault management system 133 and/or the network ticket library 150. It is understood that the examples provided with respect to the discussion of FIG. 1D is for illustration purposes only, and therefore should not be construed to limit the scope of embodiments consistence with the present disclosure. It is understood that more and/or less fields may be present within various source tickets 155. For example, in some embodiments, information included within the alarms and/or traps may be included in the source ticket 155, such as illustrated in FIG. 1E.

Turning briefly to FIG. 1E, with continued reference to FIG. 1A, an example of alarm contents and trap contents from collected network event data 169 is illustrated, according to an embodiment of the present disclosure. In an embodiment, the collected network event data 169 includes alarm contents 169A and trap contents 169E. The alarm contents 169A can include an alarm timestamp field 169B that indicates a time and/or date that the alarm was generated based on the occurrence of a trap. As seen in the illustrated embodiment in FIG. 1E, a trap and an alarm may be associated and the alarm may be generated based on the occurrence of the trap, thereby causing the alarm to have a timestamp that is after the timestamp of the corresponding trap. The alarm contents 169A also can include an alarm source field 169C that can identify a network address of a trap that caused the generation of the alarm. The alarm contents 169A also can include an alarm text field 169D that indicates a network fault situation, which may be the same description provided in the network fault condition field 155I of the source ticket 155. In some embodiments, the text and/or contents provided in the alarm text field 169D and/or the network fault condition field 155I may be used by the ECOMP platform 104 as a basis for identifying the network fault condition 166 during the network event data collection process 190.

The collected network event data 169 also can include a trap that can include trap contents, such as the trap contents 169E. The trap contents 169E can include a trap timestamp field 169F that indicates a time and/or date in which a network fault event that occurred so as to trigger the generation of the trap. The trap contents 169E also can include a trap source field 169G that indicates a network address corresponding to the network location within the network infrastructure that detected and/or was affected by the network fault event. In some embodiments, a trap can correspond with standard protocol format, such as a simple network management protocol ("SNMP") trap. In some embodiments, an alarm can correspond with a standard format, such as a SNMP alarm. The trap contents 169E also can include a trap name and variable bindings ("varbinds") field 169H that indicates a variable binding sequence that can have an object identifier and one or more strings that indicate a session state, a session down reason, and a session down identifier. For example, as illustrated, the trap name and varbinds field 169H can identify a session down, a session non-existent state, a peer sent notification, and a neighbor's interface of "536." It is understood that the examples provided are for illustration purposes only, and therefore should not be construed as limiting the scope of present disclosure.

Turning back to FIG. 1B, the trap-alarm-ticket closed loop analytics data model 170 can proceed along path 4 where the DCAE controller 108 and/or the collection traceback engine 168 can perform a ticket traceback data association flow 174. The ticket traceback data association flow 174 can be performed to identify what network event data should be collected for use in generating one or more qualified source tickets 156, such as by identifying a type of network fault situation/condition, determine criteria as to the type of associations that should be present amongst the various instances of traps and alarms, and identify a set of traps and alarms that are associated with existing source tickets 155 within the passive ticket set 154. The ticket traceback data association flow 174 can indicate one or more associations by which to identify the trap-alarm-ticket criteria 167. For example, the trap-alarm-ticket criteria 167 can be used to identify the specific traps and/or alarms (or sets thereof) that are associated with a detected fault situation, such as indicated by the network fault condition field 155I, the alarm text field 169D, and/or the trap name and varbinds field 169H. In some embodiments, the traps and alarms should have the following criteria (which can be an embodiment of the trap-alarm-ticket criteria 167) in common so as to be collected from the trap set 116 and the alarm set 118 as part of the network event data collection process 190: 1) the trap timestamp field 169F should indicate a time that is close in time (e.g., within one, two, ten minutes, etc.) and prior to time indicated by the alarm timestamp field 169B; 2) have a matching an asset identifier such as indicated in the asset identifier field 155G, the alarm source field 169C, the trap source field 169G, and/or any remote devices that are connected to the address indicated by an asset identifier; and 3) text that is indicated in the trap name and varbinds field 169H, the alarm text field 169D, and/or the network fault condition field 155I. It is understood that the trap-alarm-ticket criteria 167 can have additional and/or different requirements than those discussed above, such as criteria concerning the amount of time that elapses between the occurrence of a trap, alarm, and/or ticket (e.g., associations must correspond with timestamps that occur within X minutes of each other, as shown in FIG. 1F). It is understood that the examples provided are for illustrative purposes only, and therefore should not be construed as limiting in any way.

The trap-alarm-ticket closed loop analytics data model 170 can continue along the path 4, where the DCAE controller 108 and/or the collection traceback engine 168 can perform the ticket traceback data association flow 174. A diagram illustrating a visual representation of the ticket traceback data association flow 174 is provided in FIG. 1F. The ticket traceback data association flow 174 can include an analysis performed by ECOMP platform 104, where the collection traceback engine 168 can use the trap-alarm-ticket criteria 167 to identify associations and patterns amongst the traps and alarms in order to enable the creation of a fault pattern string 112 for rapid identification of a root cause and originator for network fault events. As shown in FIG. 1F, with continued reference to FIGS. 1A-1E, in an embodiment, an example of the ticket traceback data association flow 174 for determining associations and patterns between traps, alarms, and source tickets 155 based on the trap-alarm-ticket criteria 167 is provided. The ECOMP platform 104 can create the ticket traceback data association flow 174 to identify associations and create a fault pattern string 112 that can assemble correlations and associations into a queryable form for incorporation into one or more qualified source tickets 156. For example, the collection traceback engine 168 of the ECOMP platform 104 can be used to compare time sequences between the occurrence of alarms, traps, and tickets, such as shown in FIG. 1F.

The ECOMP platform 104 can collect and retrieve network event data from the network ticket library 150 and compile the plurality of collected traps and alarms that were generated within a proximate time frame of a source ticket 155 (e.g., within one hour of the source ticket generation), where the source ticket 155 was passively and/or statically generated according to the fault reporting schedule 137. Each trap, alarm, and ticket can be concatenated based on a timestamp, such as shown in a timestamp column 174A of FIG. 1F. The ECOMP platform 104 can chronologically list any traps, alarm, and tickets that occurred so as to serve as a basis for the determining associations and/or patterns within the network event data. For example, the collection traceback engine 168 can determine that a source ticket 155 was generated at time 8:58:37, such as shown in a ticket column 174D, and indicates an MPLS LDP session down fault. The ticket indicating the MPLS LDP session down was generated based on an alarm—as seen in the alarms column 174C—that shows a "CISCO to JUNIPER failure" alarm at time 8:57:30. In turn, the "CISCO to JUNIPER failure" alarm was generated based on SNMP polling that detected a trap at time 8:57:30, such as seen in the traps column 174B. By assembling a plurality of traps and alarms prior to the generated ticket, the ECOMP platform 104 can identify associations and patterns that may not be apparent using only one source ticket. For example, the collection traceback engine 168 can determine that five different alarm events occurred, which the collection traceback engine 168 can label (0)-(4) in the alarms column 174C. The collection traceback engine 168 can determine, based on the trap-alarm-ticket criteria 167, that each of the alarms that have been labeled (0)-(4) may have been generated based on one or more traps in the traps column 174B. For example, the LAG down alarm (0) at 8:52:13 can correspond with two SNMP trap link down traps at 8:50:20 based on both corresponding with a time of arrival ("TOA") event. Similarly, the MPLS LDP session down (1) alarm may be determined to have a virtual private edge ("vPE") network element type, which corresponds with a "jnxLdpSesDown" trap (1) that occurred at 8:50:22. The OSPF neighbor state change alarm (2) at time 8:51:24 is determined to correspond with a link state change for a core router ("CRS"), which is indicated in the neighbor state change trap (2) at time 8:50:23. Additionally, a LAG down (3) alarm at time 8:53:48 may also correspond with a TOA event, and the collection traceback engine 168 may identify the closest related SNMP trap event to establish the association, such as indicated by the "SNMP_trap_link_up" traps (3) at time 8:53:38 and time 8:53:47. Thus, in some embodiments, the collection traceback engine 168 may identify associations between alarms and traps based on traps that occurred after a first instance of an alarm type (e.g., a first LAG down TOA alarm at time 8:52:13) and prior to a second instance of the alarm type (e.g., the second LAG down TOA alarm at time 8:53:48). In some embodiments, the collection traceback engine 168 also can identify an MPLS LDP session up alarm (4) that corresponds with a vPE at time 8:53:49, and determine that the alarm is associated with a "jnxLdpsesUp" trap (4) at time 8:53:49. Based on the associations, the collection traceback engine 168 can create one or more fault pattern strings 112 that can be used for root cause analysis and the generation of qualified source tickets 156. Thus, the ticket traceback data association flow 174 can assemble the network event data so as to facilitate the creation of the analytics ticket set 151 and one or more qualified source tickets 156 that can be included therein. The discussion will return to FIG. 1B, where trap-alarm-ticket closed loop analytics data model 170 will be further explained in view of the above disclosure.

Returning to FIG. 1B, the trap-alarm-ticket closed loop analytics data model 170 can return to a network fault events 171 box where the ECOMP platform 104 can use the associations and patterns from the ticket traceback data association flow 174 to identify the types of traps that were indicated as being associated with a source ticket that was resolved through previous identification of a root cause. The trap-alarm-ticket closed loop analytics data model 170 can proceed along path 5 to a source alarm root cause analytics box 175 to indicate that the ECOMP platform 104 can implement an analysis to identify the root cause and source of the traps and alarms associated with source tickets 155, such as by implementing the closed loop analytics process 200, which is discussed below with respect to FIG. 2A.

The trap-alarm-ticket closed loop analytics data model 170 can proceed along path 6 to analyze fault situations 173 in the alarm set 118 from the ticket traceback data association flow 174 so as to serve as a basis for generating a qualified source ticket 156, which will be discussed in further detail with respect to FIGS. 2A-2E. The qualified source ticket 156 can be implemented predictively as part of the analytics ticket set 151 that can be added to the more reactive type of tickets found in the passive ticket set 154. Once one or more qualified source tickets 156 are generated, the ECOMP platform 104 can detect network event data in real-time and/or near-real-time via on-demand and/or continuous polling (e.g., apart from the fault reporting schedule 137). The ECOMP platform 104 can use an analytics ticket data association flow 176 to determine whether the collected network event data have the same pattern and/or associations in the fault situation and network resolution condition text that are present within one or more qualified source tickets 156 that exist within the network ticket library 150. If so, then the matching qualified source ticket can be used to identify the root cause of the network fault event described in the qualified source ticket, which would include the same information as the network resolution condition text field 155C such as shown in FIG. 1D but made available in a fraction of the time that would have been spent querying only the passive ticket set 154. Thus, by querying only qualified source tickets 156, the ECOMP platform 104 can identify root causes for network fault events and possible identifications of faulty network elements in a predictive manner and without having to wait for the fault reporting schedule 137 to update the source tickets 155 of the passive ticket set 154. In some embodiments, the trap-alarm-ticket closed loop analytics data model 170 can proceed along path 8 so as to communicate with the user equipment 160 and report information about the root cause via a ticket delta alert service 148 and a ticket delta application 164 on the user equipment 160. The ticket delta alert service 148 can send the identity of the network element (e.g., the fault originator identification 161 corresponding to the network device, function, service, etc.) that is at the root cause of the network fault to the ticket delta application 164 on the user equipment 160. The ticket delta application 164 can also indicate whether one or more qualified source tickets 156 were used in the identification of a root cause. It is understood that the examples provided are for illustration purposes only, and therefore should not be construed as limiting in any way.

Figure 1G:
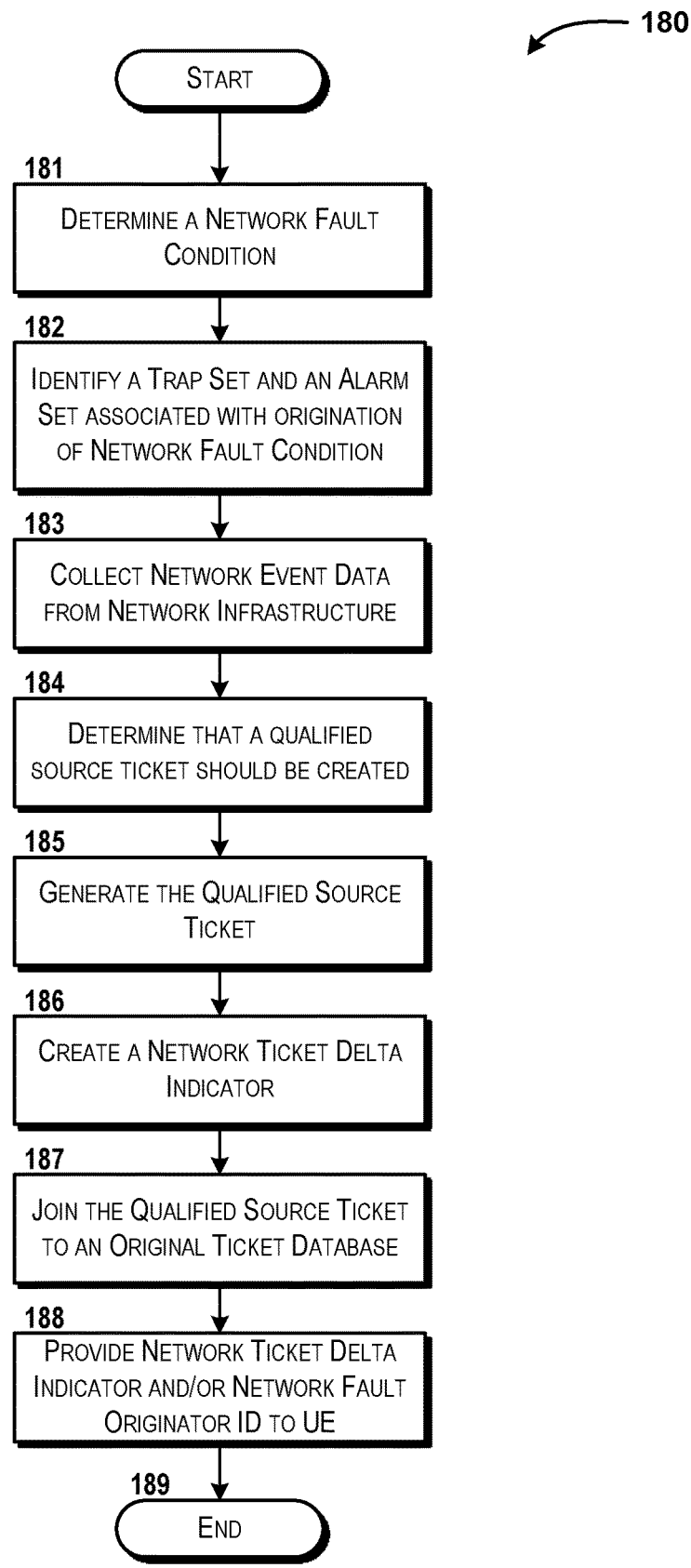
FIG. 1G is a flow diagram illustrating aspects of a method for network fault origination identification, according to an illustrative embodiment.
Figure 1H:
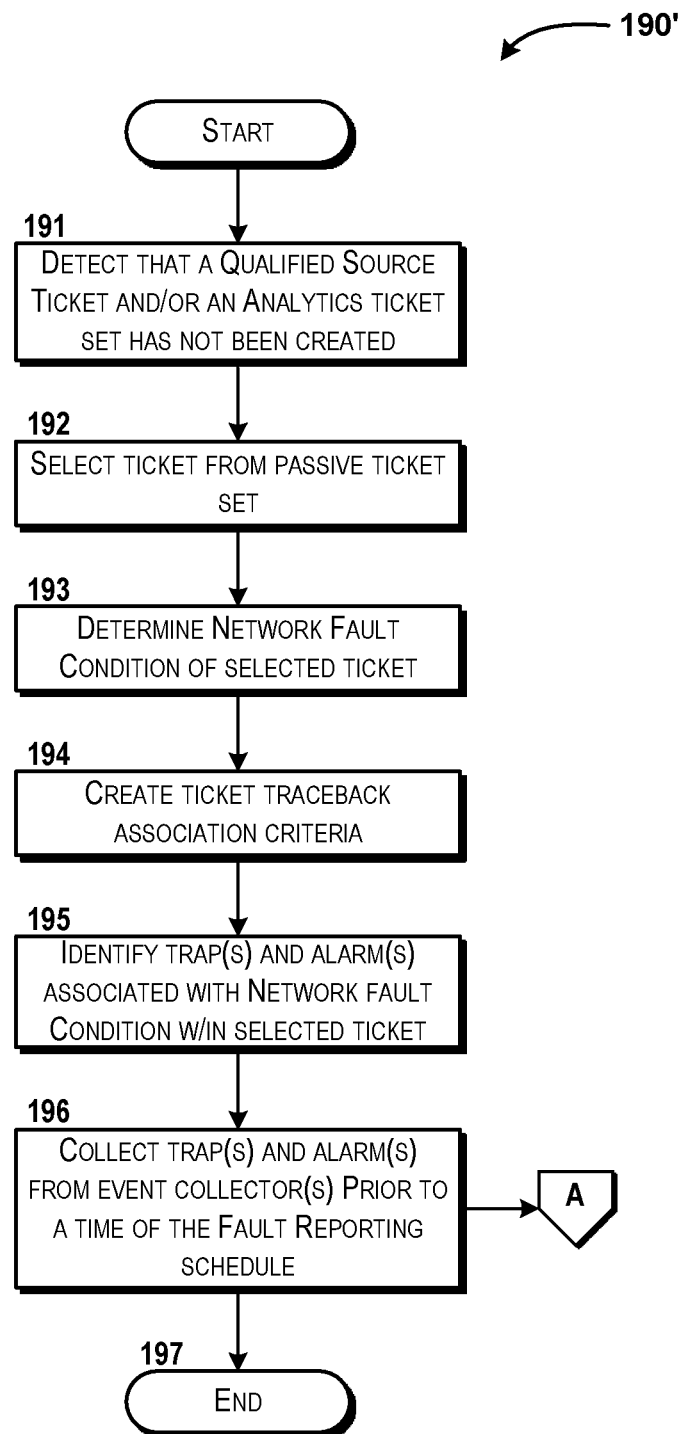
FIG. 1H is a flow diagram illustrating aspects of a method for performing a network event data collection process for network fault origination identification, according to an illustrative embodiment.

Turning now to FIG. 1G, with continued reference to FIGS. 1A-1F, aspects of a method 180 for network fault origination identification will be described in detail, according to an illustrative embodiment. It should be understood that the operations of the one or more methods disclosed herein (e.g., the method 180, a method 190', a method 200', a method 202', a method 204', a method 242', and/or a method 300' discussed below) are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, user equipment, mainframe computers, personal computers, network servers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing and transforming a processor of a computing system or device, such as the control system 102, any of the network infrastructure 114, the user equipment 160, and/or the network 140, to perform one or more operations and/or causing the processor to direct other components of the computing system or device to perform one or more of the operations.

For purposes of illustrating and describing the concepts of the present disclosure, the methods disclosed herein are described as being performed by the control system 102 via execution of one or more software modules (i.e., executable data processes that instruct and transform a process) such as, for example, the DCAE controller 108, the policy engine 142, the master service orchestrator 143, the cloud SDN controller 144, the closed loop analytics engine 111, the collection traceback engine 168, the ticket delta analytics engine 146, the DCAE service 106, the ticket delta alert service 148, and/or the ticket delta application 164 that configure one or more processors. It should be understood that additional and/or alternative devices and/or network elements can, in some embodiments, provide the functionality described herein via execution of one or more modules, applications, and/or other software including, but not limited to, the fault management system 133 executing one or more of the event collectors 138 and/or the connectivity monitor tool 136. Thus, the illustrated embodiments are illustrative, and should not be viewed as being limiting in any way. The methods 180, 190', 200', 202', 204', 242', and 300' will be described with reference to one or more of the FIGS. 1A-1H, 2A-2F, and FIG. 3.

The method 180 of FIG. 1G begins at operation 181, where the control system 102 can determine the presence and identity of a network fault condition based on a source ticket, such as the network fault condition 166 that can be determined based on one or more of the source tickets 155 of the passive ticket set 154. The source tickets 155 may have been generated and stored in the original ticket database 153 according to the fault reporting schedule 137, which dictates a polling time and/or polling frequency by which network fault events and tickets are reported to the network ticket library 150 (e.g., every four minutes, twenty minutes, thirty minutes, etc.). In some embodiments, the source ticket 155 may include information about the status and resolution of the network fault condition 166, such as discussed with respect to FIG. 1D. In some embodiments, the control system 102 can execute the collection traceback engine 168 within the ECOMP platform 104 to collect the source ticket 155 and determine the network fault condition 166. The network fault condition 166 can correspond with a network fault event that was experienced and/or detected by one or more network elements within the network infrastructure 114, such as discussed above with respect to FIG. 1A.

From operation 181, the method 180 can proceed to operation 182, where the collection traceback engine 168 of the control system 102 can identify at least one trap and at least one alarm that are associated with the origination of the network fault condition 166. In some embodiments, a plurality of traps in the form of the trap set 116 and a plurality of alarms in the form of the alarm set 118 may be identified based on association with information included within the source ticket 155. For example, the collection traceback engine 168 can use the asset identifier field 155G, the network element identifier field 155H, the time/data fault reported field 155D and/or other data indicated by the trap-alarm-ticket criteria 167 to determine which traps and alarms should be collected and analyzed.

From operation 182, the method 180 can proceed to operation 183, where the control system 102 can collect network event data, such as the collected network event data 169, from the network infrastructure 114. For example, the collected network event data 169 can include traps and alarms that were identified as being associated with the network fault condition 166 from the source ticket 155. The traps and alarms of the collected network event data 169 can be obtained from amongst the trap set 116 and/or the alarm set 118. In some embodiments, control system 102 can instruct one or more of the connectivity monitor tool 136, the event collectors 138, and/or the fault management system 133 to provide the traps and alarms that conform to the trap-alarm-ticket criteria 167 and constitute the collected network event data 169. In some embodiments, the traps and alarms are collected irrespective of time parameters dictated in the fault reporting schedule 137, which may define one or more polling times where the fault management system 133 will provide network event data and tickets to the control system 102. For example, the control system 102 may instruct the event collectors 138 to retrieve and provide traps and alarms prior to a polling time defined by the fault reporting schedule 137, where the polling time corresponds with a static schedule in which network event data and tickets are reported to the control system 102 in a delayed manner. Thus, the control system 102 can provide real-time and/or near real-time analysis by not conforming to the times indicated in the fault reporting schedule 137. In some embodiments, the traps and alarms that comprise the collected network event data 169 may be stored in the network ticket library 150, such as part of the original ticket database 153. In some embodiments, the collected network event data 169 can include traps and alarms, where the traps are instances of a simple network management protocol trap and the alarms are instances of the a simple network management protocol ("SNMP") alarm.

From operation 183, the method 180 can proceed to operation 184, where the control system 102 can analyze the collected network event data 169 and the source ticket 155 so as to determine that a qualified source ticket should be created, such as the qualified source ticket 156. In some embodiments, the control system 102 can build the root cause correlation information model 109 that includes associations and patterns, such as the fault pattern string 112, so as to serve as a basis for determining that a qualified source ticket should be created. In some embodiments, the control system 102 can determine whether the original ticket database 153 already includes a qualified source ticket that pertains to the network fault condition indicated in the source ticket 155, and if not, then the control system 102 can determine that a qualified source ticket should be created so as to increase the speed with which future network fault events are resolved. In some embodiments, the control system 102 can perform one or more operations from various embodiments of methods discussed herein to determine whether a qualified source ticket should be created, such as discussed with respect to the method 204' in FIG. 2E below.

From operation 184, the method 180 can proceed to operation 185, where the control system 102 can generate a qualified source ticket, such as the qualified source ticket 156 based at least in part on the collected network event data 169. In some embodiments, the qualified source ticket 156 is generated to have the same network fault condition and the same network resolution condition that is determined from in the source ticket 155 (e.g., from the network resolution condition text field 155C that is mimicked in the qualified source ticket), while also including pointers to associations (e.g., the trap-alarm-ticket criteria 167) and patterns (e.g., the fault pattern string 112) among traps and faults that lead up to the network fault condition indicated in the source ticket 155 and qualified source ticket 156. Thus, should a network fault event occur in the future, instances of traps and alarms can be used as content to query the qualified source ticket 156 so as to determine the root cause via the indicated network resolution condition within the qualified source ticket 156. In some embodiments, the qualified source ticket 156 can be generated prior to one of the event collectors 138 and/or the connectivity monitor tool 136 reporting a connectivity loss within the network infrastructure 114 via one or more traps and/or alarms based on the fault reporting schedule 137. This means that the control system 102 can poll and retrieve network event data in real time and/or near-real time without adhering to the fault reporting schedule 137.

From operation 185, the method 180 can proceed to operation 186, where the control system 102 can create a network ticket delta indicator, such as the ticket delta indicator 157, based on the generation of the qualified source ticket 156. The ticket delta indicator 157 may be created to provide an indication to the ticket delta alert service 148 that the qualified source ticket 156 was created and is available for use in future queries so as to enable predictive analytics without having to search the plurality of source tickets of the passive ticket set 154. Because the qualified source ticket 156 was not originally a part of the passive ticket set 154 within the original ticket database 153, the ticket delta indicator 157 may be used as a flag so as to demarcate between source tickets 155 that were generated in a delayed, static process according to the fault reporting schedule 137, and qualified source tickets that collectively provide the analytics ticket set 151 which were created using closed loop analytics, such as via the trap-alarm-ticket closed loop analytics data model 170.

From operation 186, the method 180 can proceed to operation 187, where the control system 102 can execute the ticket delta analytics engine 146 to join, add, append, and/or otherwise store the qualified source ticket 156 to the original ticket database 153. In some embodiments, the qualified source ticket 156 can be added to the analytics ticket set 151 that includes a plurality of previously created qualified source tickets that address various network fault conditions. In some embodiments, the analytics ticket set 151 and the passive ticket set 154 can be stored within the original ticket database 153 of the network ticket library 150.

From operation 187, the method 180 can proceed to operation 188, where the control system 102 can provide the ticket delta indicator 157 to the ticket delta application 164 on the user equipment 160. For example, in some embodiments, the control system 102 can execute the ticket delta analytics engine 146 to provide the ticket delta alert service 148 that communicates with the ticket delta application 164. The ticket delta alert service 148 can provide an automatic alert service that informs and instructs the ticket delta application 164 on the user equipment 160 to display an identification of a network element that is the root cause of a network fault event (e.g., via the fault originator identification 161) and/or the ticket delta indicator 157. In some embodiments, the ticket delta indicator 157 can be sent when a newly created qualified source ticket 156 is generated via the ECOMP platform 104 due to the original ticket database 153 not yet having a qualified source ticket that addresses the network fault condition and is accessible for query in the original ticket database 153. In some embodiments, the ticket delta alert service 148 can instruct the ticket delta application 164 to present a visual representation of the analytics ticket set 151 that includes one, more than one, and/or all of the qualified source tickets 156 that have been added, joined, or otherwise are able to be queried within the original ticket database 153. As such, the control system 102 can flag the qualified source tickets 156 within the analytics ticket set 151 so that queries of the original ticket database 153 will target the one or more qualified source tickets 156 prior to querying any of the passive ticket set 154, thereby decreasing processor and memory utilization. From operation 188, the method 180 can proceed to operation 189, where the method 180 can end.

Turning now to FIG. 1I1, with continued reference to FIGS. 1A-1F, a method 190' for network event data collection is provided, according to an illustrative embodiment. It is understood that the network event data collection process 190 shown in FIG. 1A can refer to the method 190', according to an illustrative embodiment. For example, the DCAE controller 108 of the ECOMP platform 104 can activate the collection traceback engine 168 to execute via a processor of the control system 102 and perform operations described in the method 190'. The method 190' can begin at operation 191, where the collection traceback engine 168 can determine that one or more qualified source tickets 156 have not yet been created to address a specific network fault event that is indicated by a source ticket within the passive ticket set 154. In some embodiments, the collection traceback engine 168 can determine that an analytics ticket set, such as the analytics ticket set 151, is not present within the original ticket database 153, and thus the original ticket database 153 of the network ticket library 150 only includes the passive ticket set 154 having source tickets 155 that were statically generated.

From operation 191, the method 190' can proceed to operation 192, where the collection traceback engine 168 can select a source ticket that belongs to the passive ticket set 154 and reside in the original ticket database 153 that is stored in the network ticket library 150. In some embodiments, the selection of the source ticket, such as the source ticket 155, may be based on a network fault condition that is identified within the source ticket 155, where the network fault condition describes a condition that triggered the generation of the source ticket 155, but alone the network fault condition may not identify which network element within the network infrastructure 114 originated a network fault event that triggered the creation of the source ticket 155.

From operation 192, the method 190' can proceed to operation 193, where the collection traceback engine 168 can determine the network fault condition of the selected source ticket 155, such as by analyzing the network fault condition field 155I of the source ticket 155. The information included within the network fault condition field 155I can describe the network fault condition experienced by at least one network element within the network infrastructure 114 (e.g., any of the PNFs 122, the VNF 120, VSFs 124, etc.). The network fault condition that is described by the source ticket 155 may be directly and/or indirectly caused by the occurrence of a network fault event within the network infrastructure. For example, a network fault event may be a circuit bounce within the network infrastructure, which causes the generation of traps, and the generation of traps triggers the creation of alarms, which in turn cause the static creation of the source ticket 155. However, prior to the source ticket 155 being resolved and closed, the network fault condition (e.g., an MPLS LDP session down condition as shown in the network fault condition field 155I) alone may not identify the network fault event and network element that served as the root cause of the fault.

From operation 193, the method 190' can proceed to operation 194, where the collection traceback engine 168 can create ticket traceback association criteria, which is represented as the trap-alarm-ticket criteria 167 in FIG. 1A. The ticket traceback association criteria can provide parameters by which to identify and collect one or more traps and one or more alarms which are associated with the network fault condition. For example, the collection traceback engine 168 can define the criteria such that a trap and/or alarm should indicate a time and date that is proximate (e.g., within one hour of) and prior to the date and time that the fault is reported within the source ticket 155, such as the time/date fault reported field 155D. For example, the collection traceback engine 168 can analyze an alarm timestamp field 169B of an alarm and a trap timestamp field 169F of a trap to determine whether the time and date indicated therein are proximate in time and prior to the time and date indicate in the time/date fault reported field 155D of the source ticket 155. The ticket traceback association criteria can also define that an asset identification indicated within the source ticket 155 (e.g., within the asset identifier field 155G) matches source information within the alarm and trap. For example, as shown in FIGS. 1D and 1E, the asset identification described in the asset identifier field 155G of the source ticket 155 matches at least a portion of the alarm source information indicated by the alarm source field 169C of an alarm, and the trap source information indicated by the trap source field 169G of a trap. By this, the collection traceback engine 168 can determine that one or more network elements that generated the trap and/or alarm are associated with the network fault condition of the source ticket being analyzed. In some embodiments, the ticket traceback association criteria can define that the traps and alarms individually identify at least a portion of the network fault condition indicated by the network fault condition field 155I and collectively the traps and alarms identify the entirety of the network fault condition described in the network fault condition field 155I. For example, as shown in FIGS. 1D and 1E, the alarm text field 169D of an alarm and the trap name and varbinds field 169H each define at least a portion of the information included in the network fault condition field 155I and collectively include all of the information included in the network fault condition field 155I. It is understood that additional criteria and/or association may be defined as being a part of the ticket traceback criteria, shown as the trap-alarm-ticket criteria 167 in FIG. 1A.

From operation 194, the method 190' can proceed to operation 195, where the collection traceback engine 168 can identify traps and alarms that conform to the ticket traceback criteria, where the traps and alarm can be collected from within the network ticket library 150 and/or from amongst the trap set 116 and the alarm set 118 that is stored within the network infrastructure 114 but have not yet been reported to the control system 102 according to the fault reporting schedule 137. In some embodiments, the collection traceback engine 168 can identify the traps and alarms based on instructing one or more of the event collectors 138, the connectivity monitor tool 136, and/or the fault management system 133 to provide alarms and traps that conform to the ticket traceback criteria.

From operation 195, the method 190' can proceed to operation 196, where the collection traceback engine 168 can receive and collect the traps and/or alarms from one or more of the event collectors 138, the connectivity monitor tool 136, and/or the fault management system 133 prior to a time that the fault reporting schedule 137 indicates traps, alarm, and/or tickets should be sent to the control system 102. By this, the control system 102 can enable real time and/or near real-time predictive analytics that reduces the delay between static ticket generation and root cause identification. The collection traceback engine 168 can collect, retrieve, or otherwise obtain traps and/or alarms without adhering to a polling time indicated by the fault reporting schedule 137. The fault reporting schedule 137 can define one or more polling times, which are periodic intervals that tools that can be controlled by the fault management system 133 adhere to statically report network event data (e.g., traps, alarms, and/or tickets) to the control system 102. For example, in some embodiments, the fault management system 133 may assume or be given control of the connectivity monitor tool 136 to poll or iteratively check for failures of network elements within the network infrastructure 114 every X time interval (e.g., every four minutes, twenty minutes, etc.). Various tools may poll and non-uniform times, thereby leading to static and inconsistent reporting of network event data to the control system 102 when adhering to the fault reporting schedule 137. The passive ticket set 154 may be created based on delayed reporting of network fault events due to static reporting of traps, alarms, and tickets according to the times defined in the fault reporting schedule 137.

From operation 196, the method 190' can proceed to operation 197, where the method 190' can end. In some embodiments, the operation 196 can proceed to method 200', which is discussed below with respect to FIG. 2A.

Figure 2A:
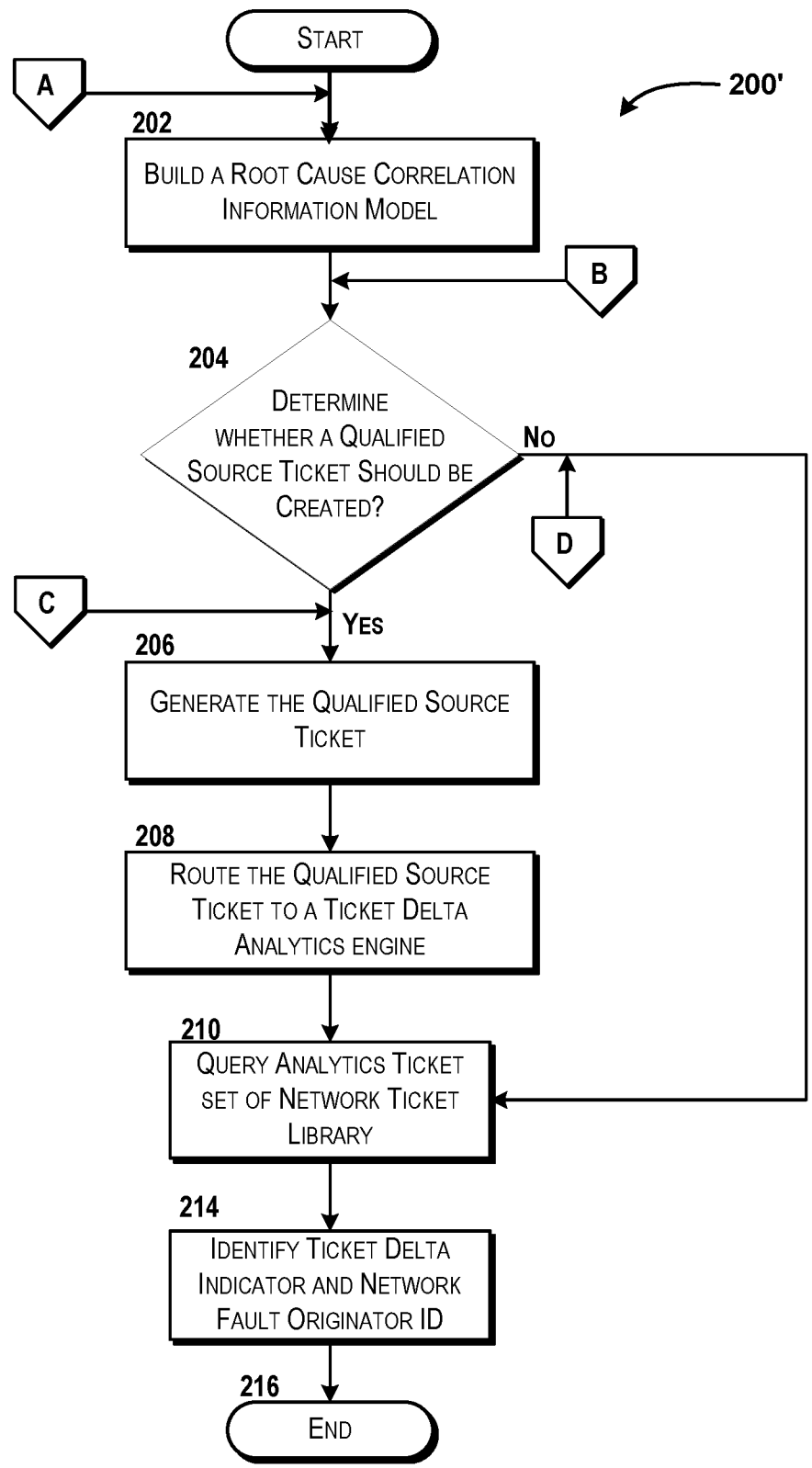
FIG. 2A is a flow diagram illustrating aspects of a method for performing a closed loop analytics process for network fault origination identification, according to an illustrative embodiment.

Turning now to FIG. 2A, a method 200' for performing a closed loop analytics for network fault origination identification is provided, according to an illustrative embodiment. It is understood that the closed loop analytics process 200 shown in FIG. 1A can refer to the method 200', according to an illustrative embodiment. For example, the DCAE controller 108 of the ECOMP platform 104 can activate the closed loop analytics engine 111 to execute via a processor of the control system 102 and perform operations described in the method 200'. The method 200' can begin at operation 202, where the closed loop analytics engine 111 can build a root cause correlation information model, such as the root cause correlation information model 109. The root cause correlation information model 109 enable the determination of relationships and correlations amongst information within traps, alarms, and tickets in order to identify which information should be included within a qualified source ticket and serve as a basis for future queries. In some embodiments, the operation 202 can take the form of a method that includes one or more operations discussed with respect to FIGS. 2B-2D so as to build the root cause correlation information model 109.

From operation 202, the method 200' can continue to operation 204, where the control system 102 can determine whether a qualified source ticket should be created, such as whether the qualified source ticket 156 should be created. In some embodiments, the operation 204 can take the form of a method that can include one or more operations discussed with respect to FIG. 2E so as to determine whether a qualified source ticket should be created. In some embodiments, the decision may be based on whether a qualified source ticket already exists within the network ticket library 150 such that the qualified source ticket addresses a specific network fault condition and resolution from a source ticket and that resolution that would only be discoverable via searching through one or more source tickets 155 and multiple traps and alarms (e.g., thousands or millions of traps and alarms) within the network ticket library 150 and/or the network infrastructure 114 in order to determine a root cause. In an embodiment where the control system 102 determines that a qualified source ticket should not be created, the method 200' can proceed along the NO path to operation 210. In an embodiment where a qualified source ticket should be created, the method 200' can proceed along the YES path from operation 204 to operation 206. For clarity, a discussion of operation 206 will proceed first, followed by a discussed of the operation 210 below.

At operation 206, the closed loop analytics engine 111 can generate a qualified source ticket, such as the qualified source ticket 156. The qualified source ticket 156 can be generated based, at least in part, on the root cause correlation information model 109. The qualified source ticket 156 can include the information found in the corresponding source ticket 155, as well as one or more fault pattern strings 112 can indicate patterns that can be identified when a network fault condition is described, and a network element type in which the control system 102 can use to identify the fault originator identification 161 corresponding to the network element that originates and is the root cause of one or more network fault events that occur within the network infrastructure 114.

From operation 206, the method 200' can proceed to operation 208, where the closed loop analytics engine 111 can route the qualified source ticket 156 to the ticket delta analytics engine 146. In some embodiments, ticket delta analytics engine 146 can perform one or more operations from the method 300', which will be discussed below with respect to FIG. 3, and which is represented by the ticket delta analytics process 300 shown in FIG. 1A. The ticket delta analytics engine 146 can support the ticket delta alert service 148 that can communicate with the ticket delta application 164 and inform the ticket delta application 164 as to whether one or more qualified source tickets have been created and added to the network ticket library 150 so as to be queryable when future network fault events occur within the network infrastructure 114. The ticket delta analytics engine 146 can add, join, and/or otherwise store the qualified source ticket 156 within the original ticket database 153, and can assign the qualified source ticket 156 to the analytics ticket set 151 of the network ticket library 150.

From operation 208, the method 200' can proceed to operation 210. At operation 210, in some embodiments, the control system 102 can poll the network infrastructure 114 (e.g., via one or more event collectors 138 and/or the fault management system 133) for network event data (e.g., traps and alarms) that indicates a network fault has occurred after the generation of one or more qualified source tickets 156. The control system 102 can use the network event data from the network infrastructure 114 to compare against the information included within the qualified source ticket 156, such as whether the network event data occurred in a time sequence that matches the fault pattern string 112 of the qualified source ticket 156 and/or matches the network fault condition of the qualified source ticket 156. The control system 102 may query only qualified source tickets that were generated by the control system 102 apart from the fault reporting schedule 137 and thus not query the source tickets 155 that were created statically according to the fault reporting schedule 137.

From operation 210, the method 200' can proceed to operation 214, where the control system 102 can identify the type of network element that caused the network fault condition indicated by the traps and alarms of the network event data, and in turn determine the fault originator identification 161 associated with the network element within the network infrastructure 114 that is the root cause and originator of the network fault events. The control system 102 may also identify the qualified source ticket 156 via the ticket delta indicator 157 and inform the ticket delta application 164 of the user equipment 160 that the qualified source ticket 156 was used to determine the root cause of the network fault condition. By this, the control system 102 can alleviate network congestion and enable more efficient processor and memory resource usage through the generation and use of qualified source tickets instead of relying on the source tickets 155 form the passive ticket set 154. From operation 214, the method 200' can proceed to operation 216, where the method 200' can end.

In some embodiments, one or more operations from the method 200' can be proceeded by the method 300', which will be discussed in further detail below. For clarity, a discussion of various embodiments of methods by which embodiments of the operations 202 and 204 from the method 200' can be performed will be provided below with respect to FIGS. 2B and 2E. It is understood that at least some, all, or none of the operations discussed with respect to the FIGS. 2B and 2E may be incorporated into any of the methods discussed herein. As such, the examples provided are for illustration purposes only, and therefore should not be construed as limiting in any way.

Figure 2B:
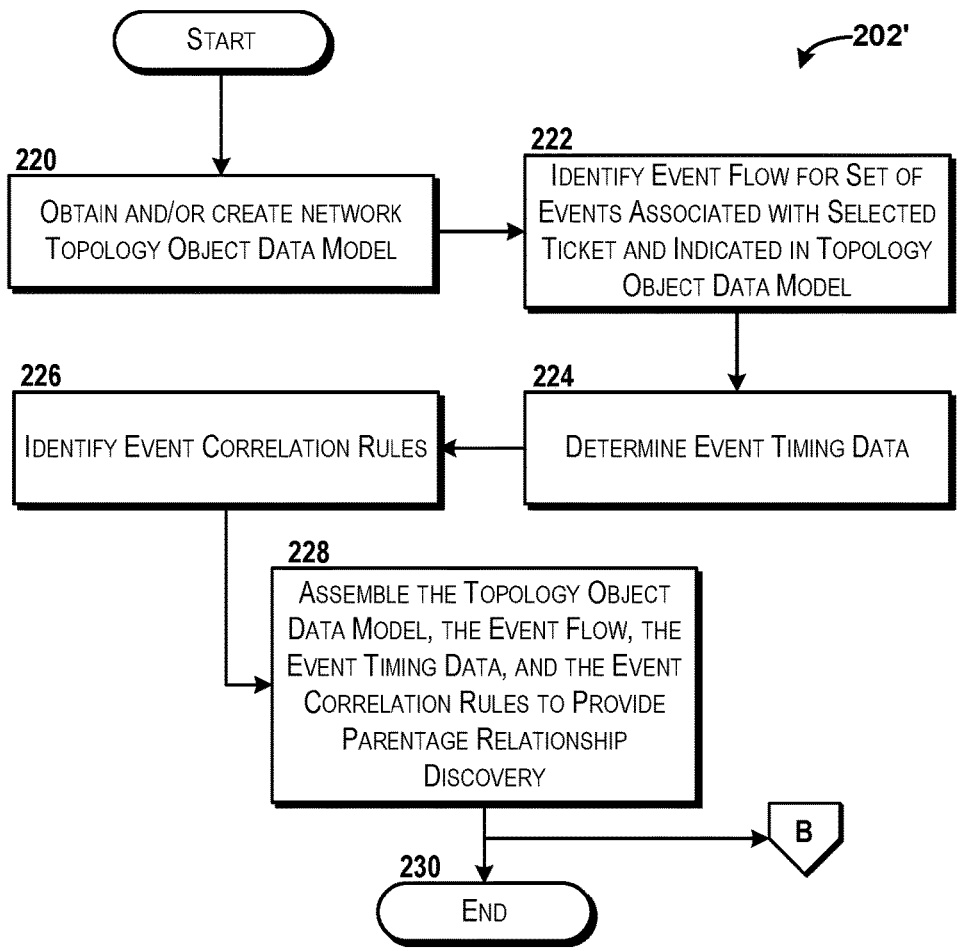
FIG. 2B is a flow diagram illustrating aspects of a method for building a root cause correlation information model, according to an illustrative embodiment.
Figure 2C:
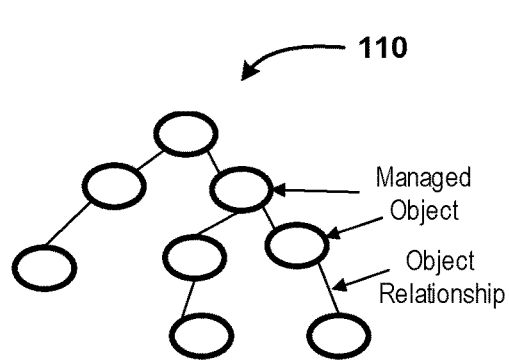
FIG. 2C is block diagram illustrating a visual representation of aspects of a Topology Object Data Model for implementing concepts and technologies discussed herein, according to an illustrative embodiment.

Turning now to FIG. 2B, with reference to FIG. 2C, a method 202' for building a root cause correlation information model 109 as set forth in operation 202 of the method 200 with respect to FIG. 2A is provided, according to an illustrative embodiment. The method 202' can begin at operation 220, where the closed loop analytics engine 111 can obtain a network topology object data model, such as the network topology object data model 110. For example, as illustrated in FIG. 2C, the network topology object data model 110 can include two or more managed objects which each correspond with a network event, such as an occurrence of a trap or an alarm that is related to a source ticket that was statically generated. The network topology object data model 110 can include an object relationship that is considered to act as an event flow by which the events of two objects may occur based on one another, such as the generation of a trap triggering an alarm. The root cause correlation information model 109 can use the source event data 113 that has information from a source ticket 155 selected from the passive ticket set 154, as well as trap and alarm information, such as discussed with respect to FIGS. 1D, 1E, and 1F. In various embodiments, each network event (i.e., each instance of a trap, alarm, and/or ticket) can be represented by a vector <t, objects(flow)>, where "t" corresponds with the trap on-set time, and "objects(flow)" corresponds with the managed objects (also called managed events) that are linked with other objects via the event flow.

The root cause correlation information model 109 can include event timing data (e.g., timestamp information, time/date fault reported information, ticket closed date/time, etc.), event flow information on managed objects within the topology object data model, and event correlation rules configured to enable determination of when a parent-child relationship between events exists within a specified time duration. For example, in various embodiments, the event correlation rules can correlate a pair of managed objects (and thus instances of event data) to determine whether a parent-child relationship exists. In some embodiments, one managed object can be considered a parent object (also referred to as parent event) if a second object is a part of the parent and the parent object occurred at a time before the second object. Stated differently, a first event (e.g., a trap) is determined to be a parent event of a second event (e.g., an alarm) if: 1) the first event is prior in time than the second event based on a designated time duration (e.g., within a 10 minute duration); and 2) the second object is a part of the first object (e.g., at least partially indicates information that is found in the network fault condition field of the source ticket 155). Event timing data corresponds with an event onset time (e.g., indicated by the time/date fault reported field 155D, the alarm timestamp field 169B, and/or trap timestamp field 169F). Based on applying the topology object data model, the event flow, the event timing data, and the event correlation rules, the root cause correlation information model 109 can enable parent-child event relationship discovery amongst instances of network event data, which is seen in relationships indicated by markings (0)-(4) in FIG. 1F. The parent-child event relationship discovery also can enable the incorporation of a fault pattern string 112 within a qualified source ticket 156 so as to indicate a correlation or pattern amongst network event data. In some embodiments, the network topology object data model 110 may be created by the control system 102 based on a source ticket 155 and network event data that triggered the creation of the source ticket 155.

From operation 220, the method 202' can proceed to operation 222, where the control system 102 can identify the event flow between a set of network event data that is associated with a selected source ticket 155, such as indicated by the network topology object data model 110. From operation 222, the method 202' can proceed to operation 224, where the control system 102 can determine event timing data, such as discussed above with respect to timestamps and date/time information shown in FIGS. 1D, 1E, and 1F. From operation 224, the method 202' can proceed to operation 226, where the control system 102 can identify the event correlation rules, such as discussed above. From operation 226, the method 202' can proceed to operation 228, where the control system 102 can assemble the network topology object data model 110, the event flow, the event timing data, and the event correlation rules so as to enable and provide parentage relationship discovery amongst instances of network event data, such as the traps and alarms that make up the source event data 113 that is associated with the source ticket 155.

In some embodiments, the method 202' can proceed from operation 228 to operation 230, where the method 202' can end. In some embodiments, from operation 228, the method 202' can proceed to operation 204 discussed with respect to FIG. 2A and further described in detail below with respect to FIG. 2E.

Figure 2D:
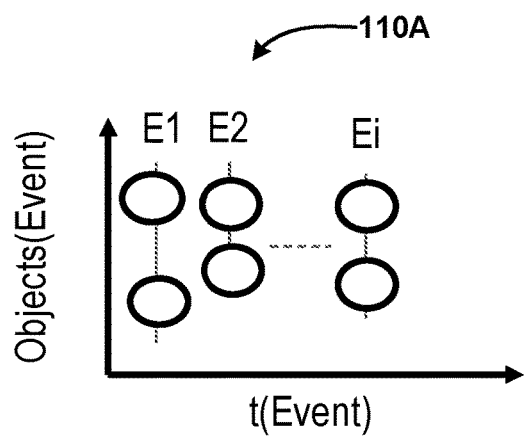
FIG. 2D is a sequence diagram illustrating a visual representation of aspects of a time sequence associated with the Topology Object Data Model, according to an illustrative embodiment.
Figure 2E:
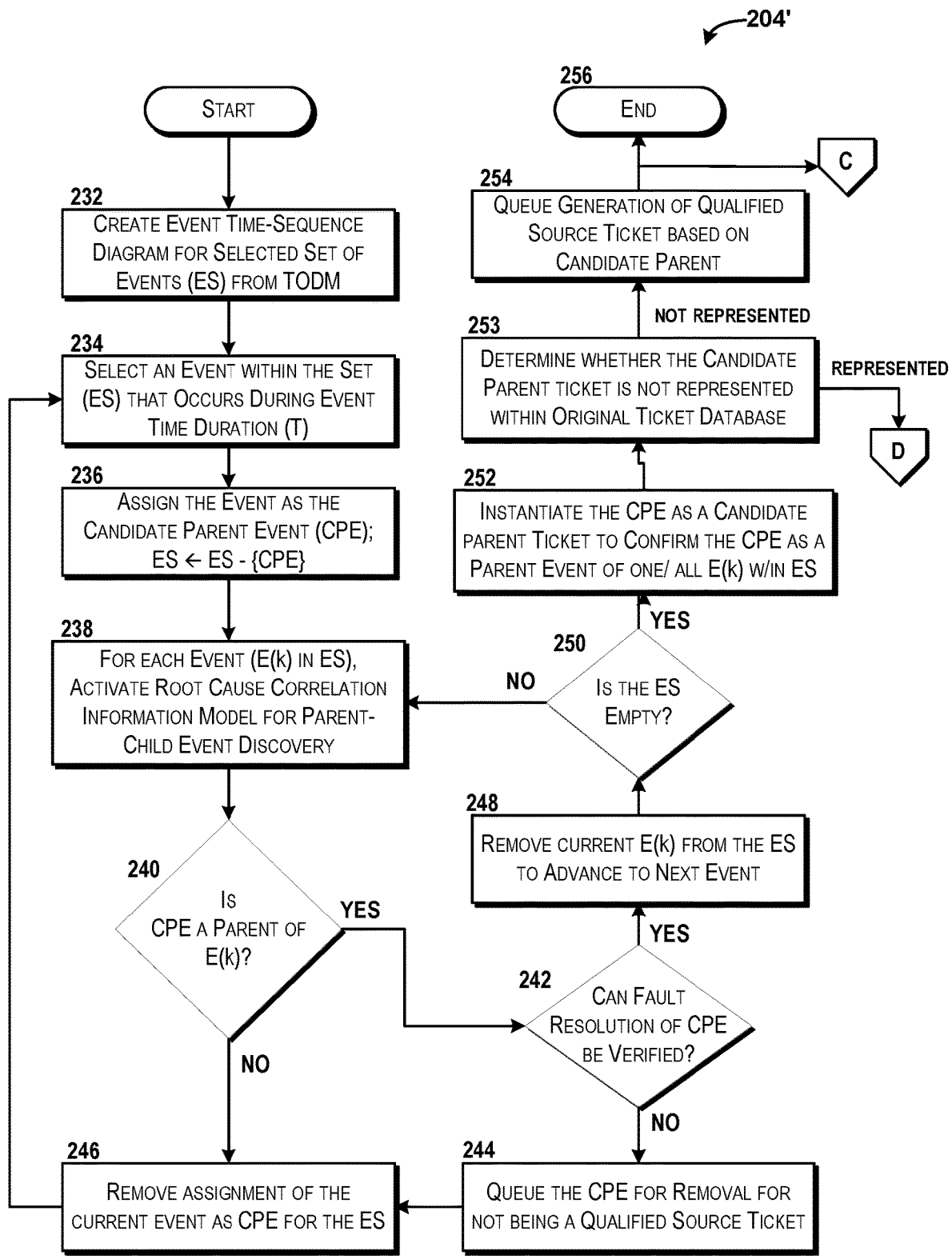
FIG. 2E is a flow diagram illustrating aspects of a method for root cause analytics that can determine whether a qualified source ticket should be created, according to an illustrative embodiment.

Turning now to FIG. 2E, a method 204' for root cause analytics to determine whether a qualified source ticket should be created as set forth in operation 204 of the method 200' with respect to FIG. 2A, is provided, according to an illustrative embodiment. The method 204' can begin at operation 232, where the control system 102 can create an event time-sequence diagram for a selected of network events associated with the network topology object data model 110 and the selected source ticket, such as the source event data 113 and the source ticket 155. For example, as illustrated in FIG. 2D, the time-sequence diagram 110A can present a plurality of objects (i.e., instances of network events such as alarms and traps) that correspond with a particular time, with objects along the Y-axis and the timing of events along the X-axis. The time-sequence diagram 110A can indicate a candidate parent event so as to determine whether a parent-child relationship exists between various network event data.

From operation 232, the method 204' can proceed to operation 234, where the control system 102 can select an event within the set of network events (indicated as objects within the network topology object data model 110 and objects/events within the time-sequence diagram 110A), where the selected event occurs during an event time duration, such as within 1 minute of other events or another defined time period. From operation 234, the method 204' can proceed to operation 236, where the control system 102 can assign the selected event to be a candidate parent event, such as by using a candidate parent designation shown as candidate parent 152 in FIG. 1A. From operation 236, the method 204' can proceed to operation 238, where all other events within the set that are not designated as the candidate parent 152 may be analyzed via activation of the root cause correlation information model 109 so as to enable and provide parent-child relationship discovery. From operation 238, the method 204' can proceed to operation 240, where the control system 102 can determine whether the event designated as the candidate parent 152 is a parent of another event within the selected event set, such as by applying the root cause correlation information model 109 as discussed above with respect to FIGS. 2B and 2C. In an embodiment, if the event designated as the candidate parent 152 is not a parent of another network event data instance being analyzed (e.g., a selected trap is not a parent of another alarm), then the method 204' can proceed along the NO path to operation 246, where the control system 102 can remove the assignment and/or designation of the selected event as the candidate parent 152 for the set of events. From operation 246, the method 204' can proceed back to operation 234, where a different instance of network event data is selected and operations 236 through operation 240 can be repeated. In an embodiment, if the event designated as the candidate parent 152 is determined to be a parent of another network event data instance being analyzed (e.g., a selected trap is a parent of an alarm), then the method 204' can proceed along the YES path to operation 242, where the control system 102 can determine whether a network resolution condition of the event can be verified. For example, in an embodiment, the control system 102 may determine whether the event includes information that corresponds with at least a portion of the network fault condition indicated in the network fault condition field 155I of the corresponding source ticket 155, and whether a resolution condition exists within the source ticket 155 (e.g., within the network resolution condition text field 155C) so as to indicate a root cause. In some embodiments, the operation 242 can be implemented via one or more operations that constitute fault resolution verification shown in FIG. 2F, which is discussed below.

In an embodiment where the control system 102 cannot verify the network fault resolution of the event designated as the candidate parent 152, then the method 204' can proceed along the NO path to operation 244, where the control system 102 can queue the network event to have the candidate parent 152 designation removed due to the network event failing to be eligible for inclusion and instantiation as a qualified source ticket. From operation 244, the method 204' can proceed to operation 246 discussed above.

In an embodiment where the control system 102 can verify the network fault resolution of the event designated as the candidate parent 152, the method 204' can proceed along the YES path to operation 248, where the event that is designated the candidate parent 152 is removed from the event data set (e.g., the set of event data shown as source event data 113) so as to allow for another event remaining within the data set to be analyzed. From operation 248, the method 204' can proceed to operation 250, where the control system 102 can determine whether the source event data 113 has any remaining event data instances in which the event designed as the candidate parent 152 could have a parent-child relationship with other instances of event data. If the source event data 113 that makes up the event data set is not empty (i.e., there remains one or more instances of network event data that can be analyzed for a potential parentage relationship), then the method 204' can proceed along the NO path, where the operations 238 and 240 can be repeated using the same candidate parent event compared with another instance of network event data. In an embodiment where the event data set is empty (i.e., there does not remain at least one instance of network event data that can be analyzed for a parentage relationship), then the method 204' can proceed from operation 250 to operation 252, where the control system 102 can instantiate a ticket for the instance of network event data designated as the candidate parent 152 so as to confirm that the network event data is a parent of at least one other event data and should be included within a qualified source ticket. From operation 252, the method 204' can proceed to operation 253, where the control system 102 can determine whether the ticket is represented within the original ticket database 153 via an already existing qualified source ticket. In an embodiment, if the ticket is already represented within original ticket database 153, then method 204' can proceed from operation 253 to operation 210 discussed in the method 200' with respect to FIG. 2A. In an embodiment, if the ticket is not already represented within the original ticket database 153, then the method 204' can proceed to operation 254, where the control system 102 can queue the generation of a qualified source ticket based on the network event that is designated as the candidate parent 152. In an embodiment, the method 204' can proceed from operation 254 to operation 206 discussed in method 200' with respect to FIG. 2A. In an embodiment, the method 204' can proceed from operation 254 to operation 256, where the method 204' can end.

Figure 2F:
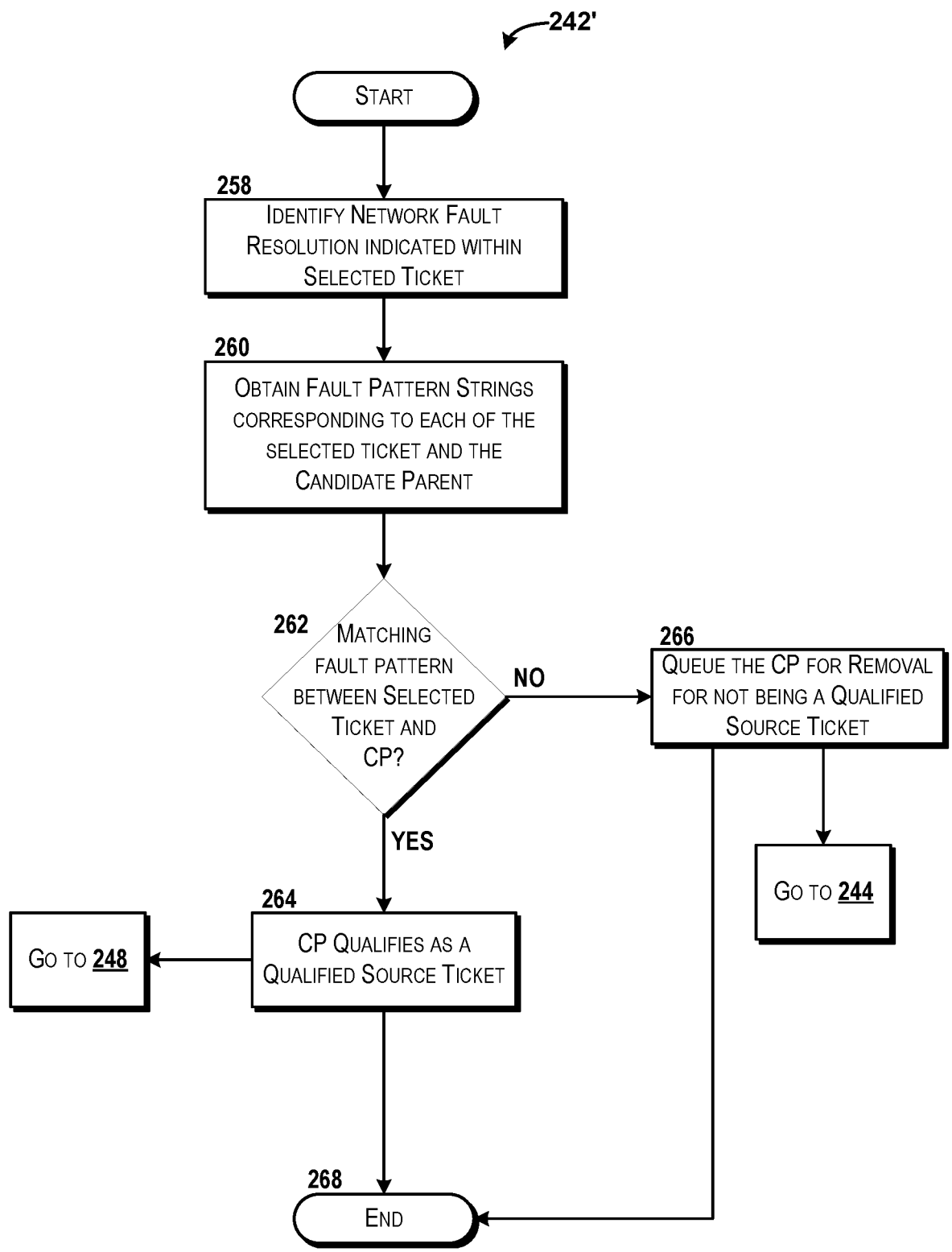
FIG. 2F is a flow diagram illustrating aspects of method for fault resolution verification, according to an illustrative embodiment.

Turning now to FIG. 2F, a method 242' for fault resolution verification, such as discussed in the method 204' with respect to FIG. 2E, is provided according to an illustrative embodiment. The method 242' can begin at operation 258, where the control system 102 can identify a network fault resolution indicated within a selected ticket, such as by analyzing the network resolution condition text field 155C of the source ticket 155 that was selected for analysis. From operation 258, the method 242' can proceed to operation 260, where the control system 102 can obtain one or more fault pattern strings 112 corresponding to each of the selected parent ticket (e.g., the source ticket 155) and the network event data designated as the candidate parent 152, such as an instance of the source event data 113. From operation 260, the method 242' can proceed to operation 262, where the control system 102 can determine whether a fault pattern of the source ticket 155 matches the fault indicated in the network event data, such as both the source ticket 155 and the instance of source event data 113 show a circuit bouncing condition as the cause of the MPLS LDP session down fault. If the network resolution text matches, then the control system 102 can indicate the fault patterns match. In an embodiment, if the network resolution text matches so as to indicate a matching or similar fault pattern, then the method 242' can proceed along the YES path to operation 264, where the control system 102 can determine that the event data qualifies for inclusion and instantiation as a qualified source ticket, such as the qualified source ticket 156. In some embodiments, the method 242' can proceed from operation 264 to operation 248, which was discussed above with respect to the method 204' and FIG. 2E. In some embodiments, the method 242' can proceed from operation 264 to operation 268, where the method 242' can end.

Returning to operation 262, in some embodiments, if the resolution condition text does not match, thereby indicating that a matching fault pattern does not exist, then the method 242' can proceed along the NO path to operation 266, where the control system 102 can queue the event data for removal of the designation as the candidate parent 152 due to the event data not being eligible for instantiation as a qualified source ticket. In some embodiments, the method 242' can proceed from operation 266 to operation 244, which discussed above with respect to the method 204' and FIG. 2E. In some embodiments, the method 242' can proceed from operation 266 to operation 268, where the method 242' can end.

Figure 3:
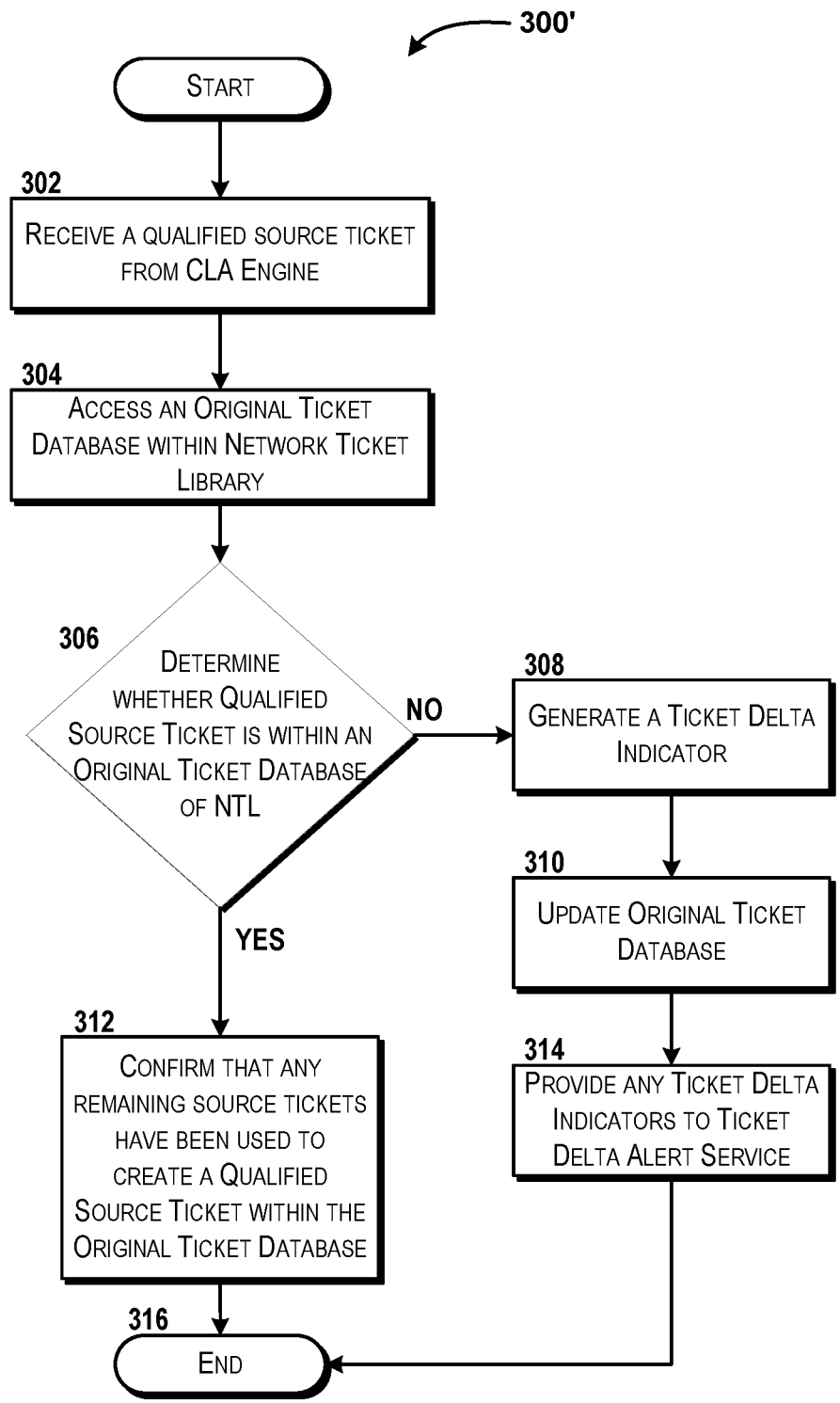
FIG. 3 is a flow diagram illustrating aspects of a method for performing a ticket delta analytics process for network fault origination identification, according to an illustrative embodiment.

Turning now to FIG. 3, a method 300' for performing a ticket delta analytics process for network fault origination identification, such as discussed with respect to FIG. 1A, is provided, according to an illustrative embodiment. It is understood that the ticket delta analytics process 300 shown in FIG. 1A can refer to the method 300', according to an illustrative embodiment. For example, the control system 102 can activate the ticket delta analytics engine 146 to execute via a processor of the control system 102 and perform one or more operations described in the method 300'.

The method 300' can begin at operation 302, where the ticket delta analytics engine 146 receives the qualified source ticket 156 that has been created by the control system 102 based on one of the source tickets 155, such as discussed with respect to method 200' of FIG. 2A. The qualified source ticket 156 can be received from the closed loop analytics engine 111 of the control system 102. From operation 302, the method 300' can proceed to operation 304, where the ticket delta analytics engine 146 can access the original ticket database 153 that is stored within the network ticket library 150. The original ticket database 153 may store one or more source tickets 155 that were statically created according to the fault reporting schedule 137. The source tickets 155 can collectively comprise the passive ticket set 154 that is stored within the original ticket database 153. From operation 304, the method 300' can proceed to operation 306, where the ticket delta analytics engine 146 can perform ticket delta analytics by determining whether the generated qualified source ticket 156 is found within the original ticket database 153 of the network ticket library 150. In an embodiment, if the qualified source ticket 156 is not within the original ticket database 153 of the network ticket library 150, then the method 300' can proceed along the NO path and proceed to operation 308. In an embodiment, if the qualified source ticket 156 is found within the original ticket database 153 of the network ticket library 150, then the method 300' can proceed along the YES path and proceed to operation 312. For clarity a discussion of operations proceeding along the NO path beginning with operation 308 will be discussed first, followed by a discussion of operation 312.

At operation 308, the ticket delta analytics engine 146 can generate a ticket delta indicator, such as the ticket delta indicator 157. The ticket delta indicator 157 can identify the qualified source ticket 156 can and enable the ticket delta application 164 to present the identity of the qualified source ticket 156 and indicate that the qualified source ticket 156 has been created. From operation 308, the method 300' can proceed to operation 310, where the ticket delta analytics engine 146 can update the original ticket database 153 with the qualified source ticket 156. For example, the qualified source ticket 156 can be added to the analytics ticket set 151, which can be stored within the original ticket database 153 and used for predictive analytics queries that exclude searching source tickets 155 from the passive ticket set 154 and instead rely on queries of one or more qualified source tickets within the original ticket database 153. In some embodiments, the ticket delta analytics engine 146 may remove the source ticket 155 from the original ticket database 153 while the original ticket database 153 is being updated. In some embodiments, the ticket delta analytics engine 146 may segment the network ticket library 150 so as to designate the source tickets 155, that were used to create one or more qualified source tickets 156 within the analytics ticket set 151, as belonging to an initial ticket database (not shown), while the qualified source tickets 156 may belong to a new ticket database (not shown) that is joined to the original ticket database 153. In some embodiments, the ticket delta analytics engine 146 can determine whether the original ticket database 153 has any source tickets 155 remaining that have not yet been used to create one or more qualified source tickets, and if so, the control system 102 can use the one or more remaining source tickets to generate another qualified source ticket, such as discussed above.

From operation 310, the method 300' can proceed to operation 314, where the ticket delta analytics engine 146 can provide one or more ticket delta indicators, such as the ticket delta indicator 157, to the ticket delta alert service 148, which in turn can be relayed to the ticket delta application 164 so as to inform the user 158 that one or more qualified source tickets 156 were created and/or used to determine a network resolution and corresponding fault originator identification 161 of a network element responsible for one or more network fault events within the network infrastructure 114. From operation 314, the method 300' can proceed to operation 316, where the method 300' can end.

Returning to operation 306, in an embodiment, if a qualified source ticket is within the original ticket database 153 of the network ticket library 150, then the method 300' can proceed along the YES path and proceed to operation 312. At operation 312, the ticket delta analytics engine 146 can confirm that any source tickets 155 that are within the original ticket database 153 have been used at least once to create one or more qualified source ticket of the analytics ticket set 151. If any source tickets 155 indicate network fault conditions that have not been incorporated into one or more qualified source tickets and thus the source ticket has not been used to create a qualified source ticket, then the control system 102 may pull the source ticket and begin the method 180 and/or the method 190' again, followed by the method 200' and the method 300'. It is understood that the examples provided are for illustration purpose only, and therefore should not be construed as limiting in any way. From operation 312, the method 300' can proceed to operation 316, where the method 300' can end.

Figure 4:
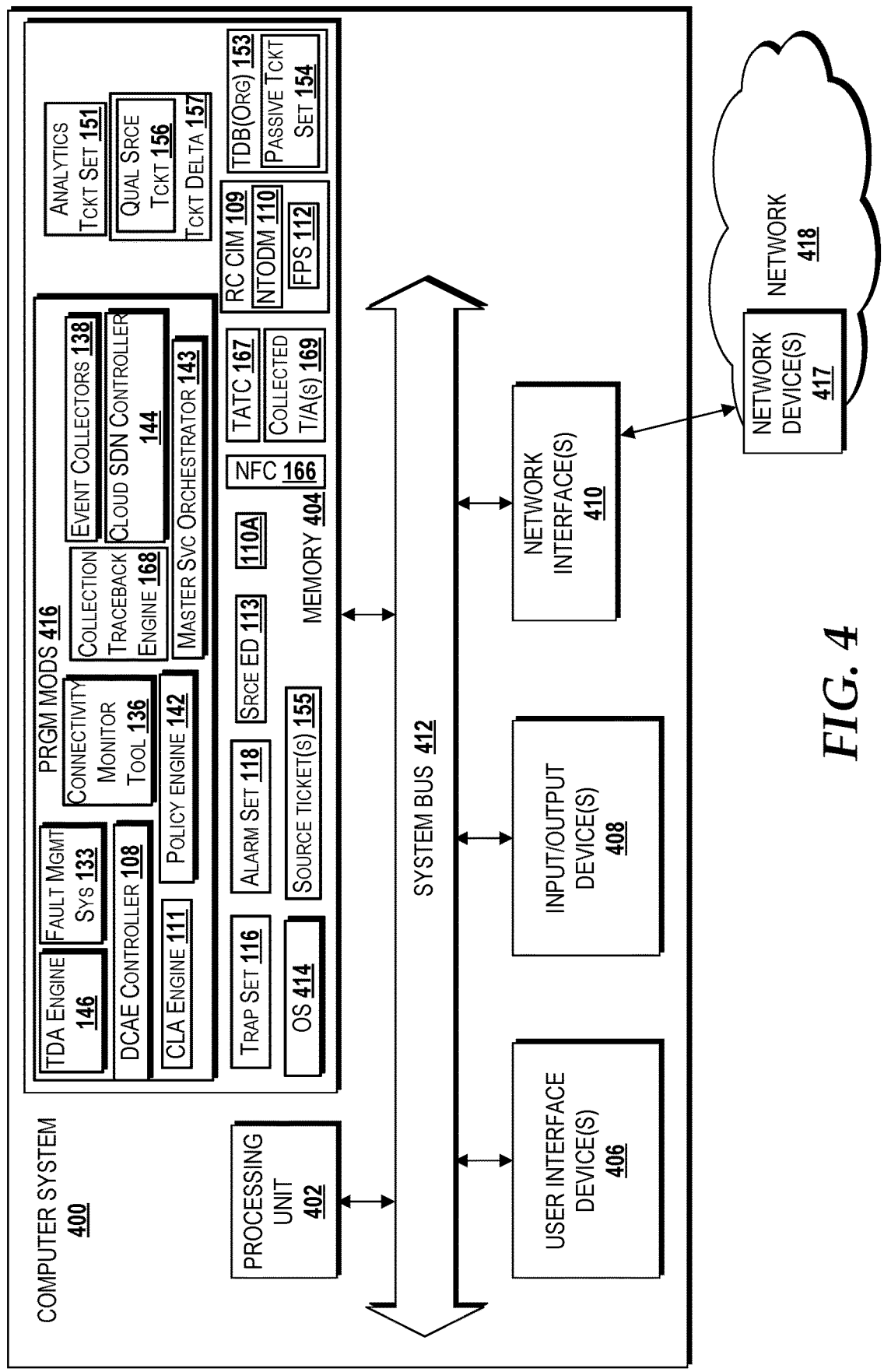
FIG. 4 is a block diagram illustrating an example computer system configured to provide, implement, and execute operations according to at least some illustrative embodiments of the concepts and technologies described herein.

Turning now to FIG. 4, a block diagram illustrating a computer system 400 configured to provide the functionality in accordance with various embodiments of the concepts and technologies disclosed herein is described. The systems, devices, and other components disclosed herein can utilize, at least in part, an architecture that is the same as or at least similar to the architecture of the computer system 400. In some embodiments, one or more of the control system 102 and the network infrastructure 114 can be configured like the computer system 400. It should be understood, however, that modification to the architecture may be made to facilitate certain interactions among elements described herein.

The computer system 400 includes a processing unit 402, a memory 404, one or more user interface devices 406, one or more input/output ("I/O") devices 408, and one or more network interfaces 410, each of which is operatively connected to a system bus 412. The system bus 412 enables bi-directional communication between the processing unit 402, the memory 404, the user interface devices 406, the I/O devices 408, and the network interfaces 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. The processing unit 402 can include one or more central processing units ("CPUs") configured with one or more processing cores, and/or one or more graphics processing unit ("GPU") configured to accelerate operations performed by one or more CPUs. The processing unit 402 can include one or more system-on-chip ("SoC") components along with one or more other components, including, for example, one or more of the memory resources, and/or one or more of the other resources. Processing units are generally known, and therefore are not described in further detail herein. It is understood that the control system 102 can implement one or more processing unit 402.

The memory 404 communicates with the processing unit 402 via the system bus 412. In some embodiments, the memory 404 is operatively connected to a memory controller (not shown) that enables communication with the processing unit 402 via the system bus 412. The illustrated memory 404 includes an operating system 414 and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 416 may include various software and/or program modules to perform the various operations described herein. In some embodiments, for example, the program modules 416 can include the ticket delta analytics engine 146, the DCAE controller 108, the fault management system 133, the connectivity monitor tool 136, policy engine 142, the closed loop analytics engine 111, the master service orchestrator 143, the event collectors 138, the cloud SDN controller 144 and/or other program modules. These and/or other programs can be embodied in computer-readable medium including instructions that, when executed by the processing unit 402, in some embodiments, may perform and/or facilitate performance of one or more of the operations discussed with respect to FIGS. 1A-H, 2A-2F, and 3, described in detail above. According to some embodiments, the program modules 416 may be embodied in hardware, software, firmware, or any combination thereof. In some embodiments, the memory 404 also can be configured to store the trap set 116, the alarm set 118, the source tickets 155, the source event data 113, the time-sequence diagram 110A, the network fault condition 166, the trap-alarm-ticket criteria 167, the collected network event data 169, the analytics ticket set 151, the qualified source tickets 156, the ticket delta indicator 157, the root cause correlation information model 109, the network topology object data model 110, the fault pattern strings 112, the original ticket database 153, the passive ticket set 154, and/or other data, if desired.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid-state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium" and variations thereof does not include waves or signals per se and/or communication media.

The user interface devices 406 may include one or more devices with which a user accesses the computer system 400. The user interface devices 406 may include, but are not limited to, computers, servers, PDAs, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer. In some embodiments, the I/O devices 408 can be used for manual controls for operations to exercise under certain emergency situations.

The network interfaces 410 enable the computer system 400 to communicate with other networks or remote systems via a network 418, such as the network 140 and/or the network 600. Examples of the network interfaces 410 include, but are not limited to, a modem, a radio frequency ("RF") or infrared ("IR") transceiver, a telephonic interface, a bridge, a router, or a network card. The network interfaces 410 may communicate with one or more network devices 417 that support the functionality of the network 418, such as physical network functions, virtual network functions, virtual and/or physical edge devices, or the like. The network device(s) 417 can, in some embodiments, include one or more network elements discussed with respect to the network infrastructure 114 of FIG. 1A. The network 418 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, or additionally, the network 418 may be or may include a wired network such as, but not limited to, a Wide Area Network ("WAN"), a wired Personal Area Network ("PAN"), a wired Metropolitan Area Network ("MAN"), a VoIP network, an IP/MPLS network, a PSTN network, an IMS network, an EPC network, or any other mobile network and/or wireline network.

Figure 5:
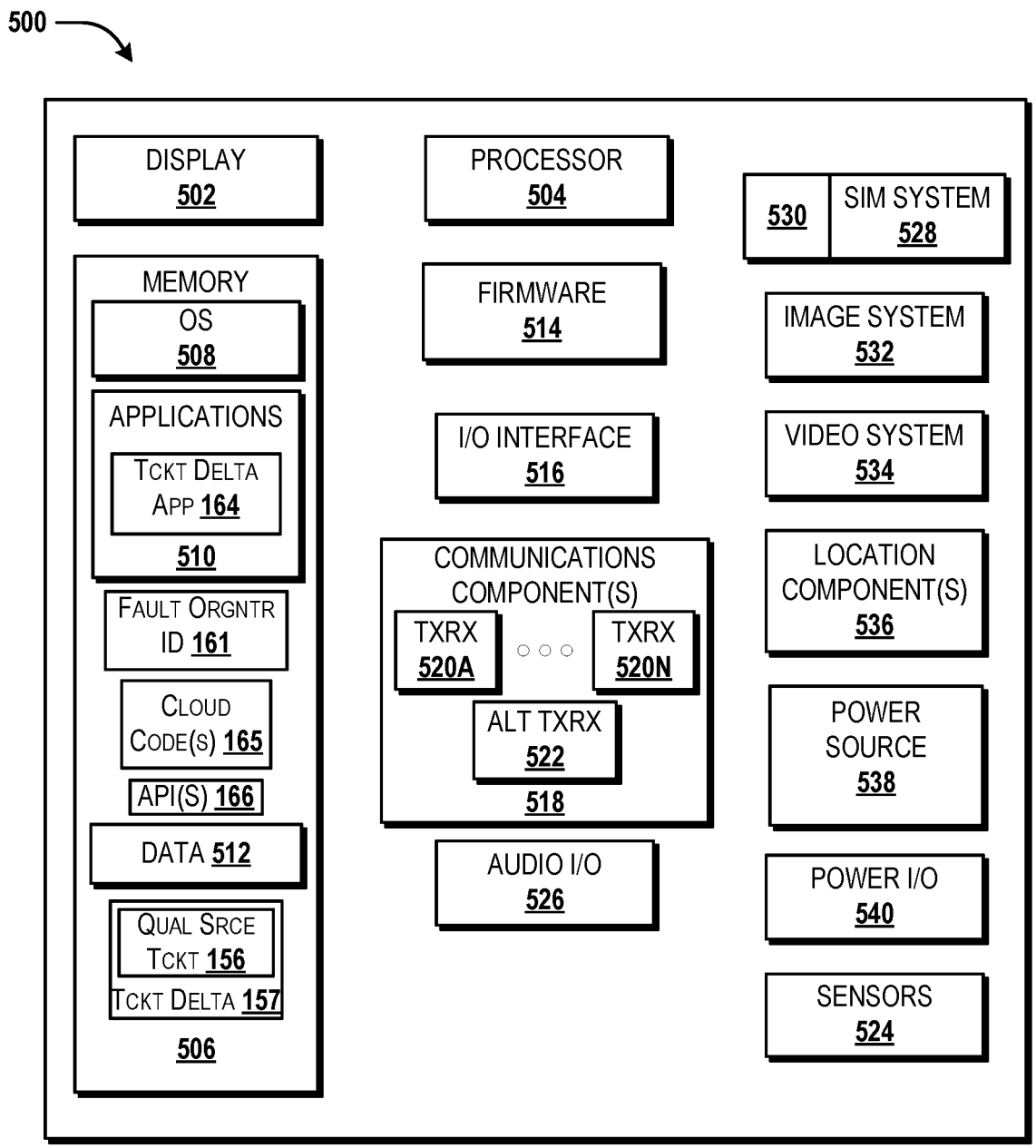
FIG. 5 is a block diagram illustrating an example user equipment capable of implementing aspects according to embodiments of the concepts and technologies described herein.

Turning now to FIG. 5, an illustrative user equipment 500 and components thereof will be described. In some embodiments, one or more of the user equipment 160 (shown in FIG. 1A) can be configured as the user equipment 500. It is understood that the user equipment 500 can be configured to take the form of a mobile communication device, a tablet, a wearable computing device, laptop, a heads-up display computer system, an augmented reality ("AR") device, a virtual reality ("VR") device, a vehicle computing system, an attachable computing device, a camera, an appliance (e.g., a refrigerator, an oven, a microwave, etc.), a television, a vehicle head unit, a handheld device, a combination thereof, or other user equipment that can implement network communications. It is understood that the examples discussed above are used for illustration purposes only, and therefore should not be construed to limit the scope of the disclosure in any way. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the user equipment 500 can include a display 502 for displaying data. According to various embodiments, the display 502 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The user equipment 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in a memory 506, or the like. In some embodiments, the applications 510 also can include a user interface ("UI") application (not illustrated in FIG. 5).

The UI application can interface with the operating system 508 to facilitate user interaction with functionality and/or data stored at the user equipment 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in interacting or otherwise entering/deleting data, being presented with information, entering and setting local credentials (e.g., user IDs and passwords) for device access, configuring settings, manipulating address book content and/or settings, multimode interaction, interacting with other applications 510, and otherwise facilitating user interaction with the operating system 508, the applications 510, and/or other types or instances of data 512 that can be stored at the user equipment 500. The data 512 can include, for example, one or more identifiers, and/or other applications or program modules (i.e., defined executable software packages that transform the processor 504 upon execution). In some embodiments, the data 512 can include one or more of the qualified source ticket 156, the ticket delta indicator 157, the analytics ticket set 151, the cloud codes 165, the application programming interface 165A, and the fault originator identification 161 and/or other data sent among and/or between the user equipment 160, the control system 102, the network 140, and the network infrastructure 114. According to various embodiments, the applications 510 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. In some embodiments, the applications 510 can include the ticket delta application 164. The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The user equipment 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ10 port, a proprietary port, combinations thereof, or the like. In some embodiments, the user equipment 500 can be configured to synchronize with another device to transfer content to and/or from the user equipment 500. In some embodiments, the user equipment 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the user equipment 500 and a network device or local device.

The user equipment 500 also can include a communications component 518. The communications component 518 can be configured to interface with the processor 504 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using Global System for Mobile communications ("GSM"), Code Division Multiple Access ("CDMA") ONE, CDMA2000, Long-Term Evolution ("LTE"), and various other 2G, 2.5G, 3G, 4G, 5G, and greater generation technology standards. Moreover, the communications component 518 may facilitate communications over various channel access methods (which may or may not be used by the aforementioned standards) including, but not limited to, Time-Division Multiple Access ("TDMA"), Frequency-Division Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 518 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 also can include an N$^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The user equipment 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. Additionally, audio capabilities for the user equipment 500 may be provided by an audio I/O component 526. The audio I/O component 526 of the user equipment 500 can include one or more speakers for the output of audio signals, one or more microphones for the collection and/or input of audio signals, and/or other audio input and/or output devices.

The illustrated user equipment 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the user equipment 500 are contemplated, it should be understood that these embodiments are illustrative, and should not be construed as being limiting in any way.

The user equipment 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The user equipment 500 may also include a video system 534. The video system 534 can be configured to capture, process, record, modify, and/or store video content. Photos and videos obtained using the image system 532 and the video system 534, respectively, may be added as message content to an MMS message, email message, and sent to another mobile device. The video and/or photo content also can be shared with other devices via various types of data transfers via wired and/or wireless communication devices as described herein.

The user equipment 500 also can include one or more location components 536. The location components 536 can be configured to send and/or receive signals to determine a geographic location of the user equipment 500. According to various embodiments, the location components 536 can send and/or receive signals from global positioning system ("GPS") devices, assisted GPS ("A-GPS") devices, WI-FI/WIMAX and/or cellular network triangulation data, combinations thereof, and the like. The location component 536 also can be configured to communicate with the communications component 518 to retrieve triangulation data for determining a location of the user equipment 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the user equipment 500. Using the location component 536, the user equipment 500 can generate and/or receive data to identify its geographic location, or to transmit data used by other devices to determine the location of the user equipment 500. The location component 536 may include multiple components for determining the location and/or orientation of the user equipment 500.

The illustrated user equipment 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the user equipment 500 can include additional and/or alternative components, the above embodiment should be understood as being illustrative of one possible operating environment for various embodiments of the concepts and technologies described herein. The described embodiment of the user equipment 500 is illustrative, and should not be construed as being limiting in any way.

Figure 6:
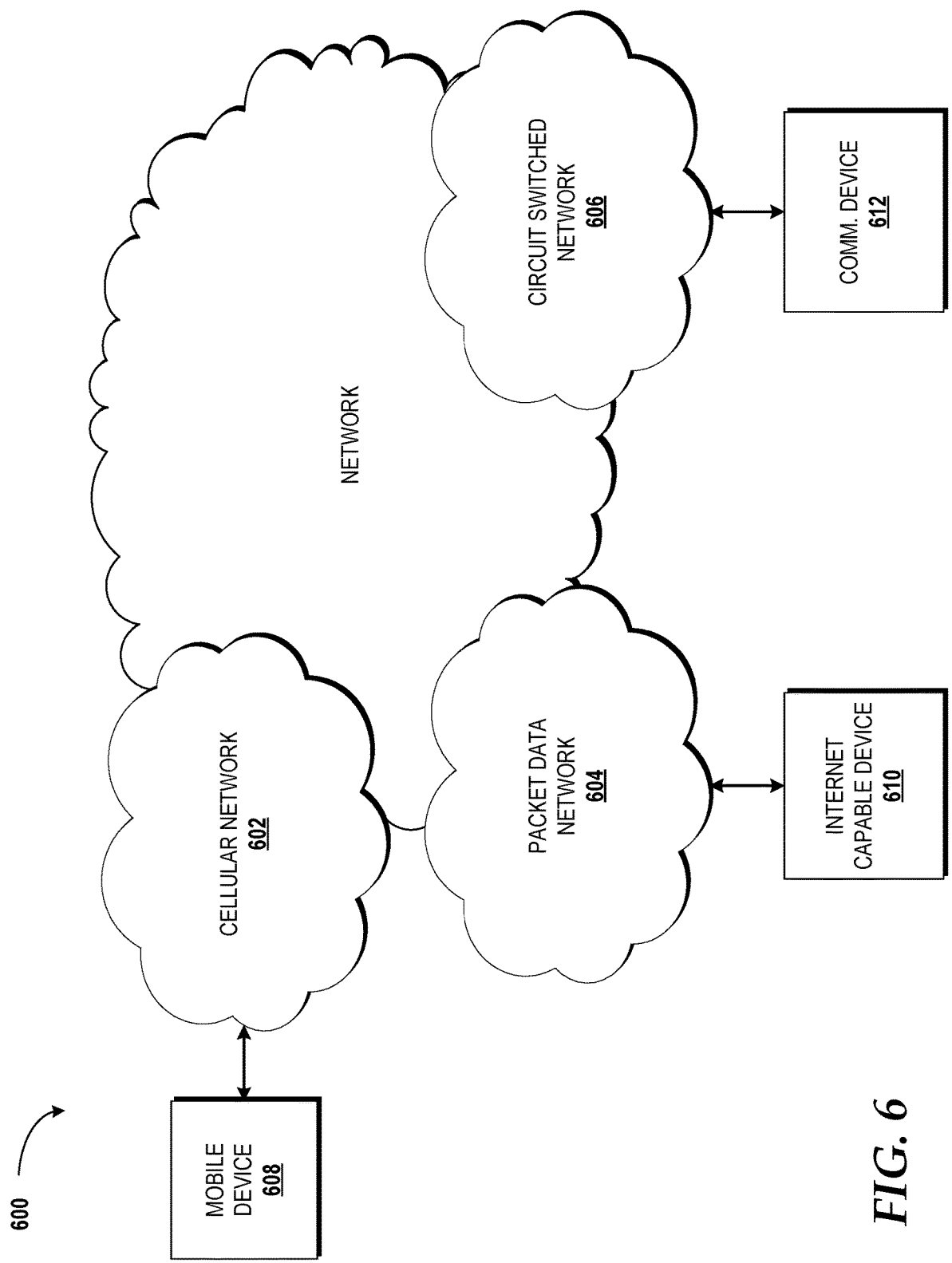
FIG. 6 is a diagram illustrating an example network capable of implementing aspects of the concepts and technologies discussed herein.

Turning now to FIG. 6, details of a network 600 are illustrated, according to an illustrative embodiment. In some embodiments, one or more of the network 140, the network infrastructure 114, and/or the network 418 can be configured, at least in part, as the network 600. The network 600 includes a cellular network 602, a packet data network 604, for example, the Internet, and a circuit switched network 606, for example, a PSTN. The cellular network 602 includes various network components such as, but not limited to, base transceiver stations ("BTSs"), NBs, eNBs, gNBs, base station controllers ("BSCs"), radio network controllers ("RNCs"), mobile switching centers ("MSCs"), MMES, short message service centers ("SMSCs"), multimedia messaging service centers ("MMSCs"), home location registers ("HLRs"), Home Subscriber Server ("HSSs"), Visitor Location Registers ("VLRs"), charging platforms, billing platforms, voicemail platforms, GPRS core network components, location service nodes, an IP Multimedia Subsystem ("IMS"), optical transport devices, and the like. The cellular network 602 also includes radios and nodes for receiving and transmitting voice, data, and combinations thereof to and from radio transceivers, networks, the packet data network 604, and the circuit switched network 606. In some embodiments, the network 140 of FIG. 1A can operate, at least in part, as the packet data network 604 and/or as or in cooperation with the cellular network 602.

The mobile communications device 608, such as, for example, a cellular telephone, a mobile terminal, a PDA, a laptop computer, a handheld computer, and combinations thereof, can be operatively connected to the cellular network 602. In some embodiments, one or more of the user equipment 160 can be configured as the mobile communications device 608. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSDPA), and HSPA+. The cellular network 602 also is compatible with 4G and 5G mobile communications standards such as LTE, or the like, as well as evolved and future mobile standards, including but not limited to LTE-Advanced, LTE-Advanced Pro and 5G.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (e.g., a "browser") for executing a web page in a format readable by the browser or other software such as executable applications. Other files and/or data may be accessible via "links" in the retrieved files, as is generally known. In some embodiments, the packet data network 604 includes or is in communication with the Internet. In some embodiments, the at least some of the network 140 can be configured as a packet data network, such as the packet data network 604. The circuit switched network 606 includes various hardware and software for providing circuit switched communications. The circuit switched network 606 may include, or may be, what is often referred to as a POTS. In some embodiments, the at least some of the network 140 also can be configured as a circuit switched network, such as the circuit switched network 606. The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. In some embodiments, the internet-capable devices 610 can include the control system 102 and any network elements of the network infrastructure 114, such as the PNFs 122. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network of FIG. 6 is used to refer broadly to any combination of the networks 602, 604, 606 shown in FIG. 6. It should be appreciated that, in some embodiments, substantially all of the functionality described with reference to the network 140, the network infrastructure 114, and/or the control system 102 can be performed by the cellular network 602, the packet data network 604, and/or the circuit switched network 606, alone or in combination with other networks, network elements, and the like, according at least to aspects of the features and operations discussed herein.

Figure 7:
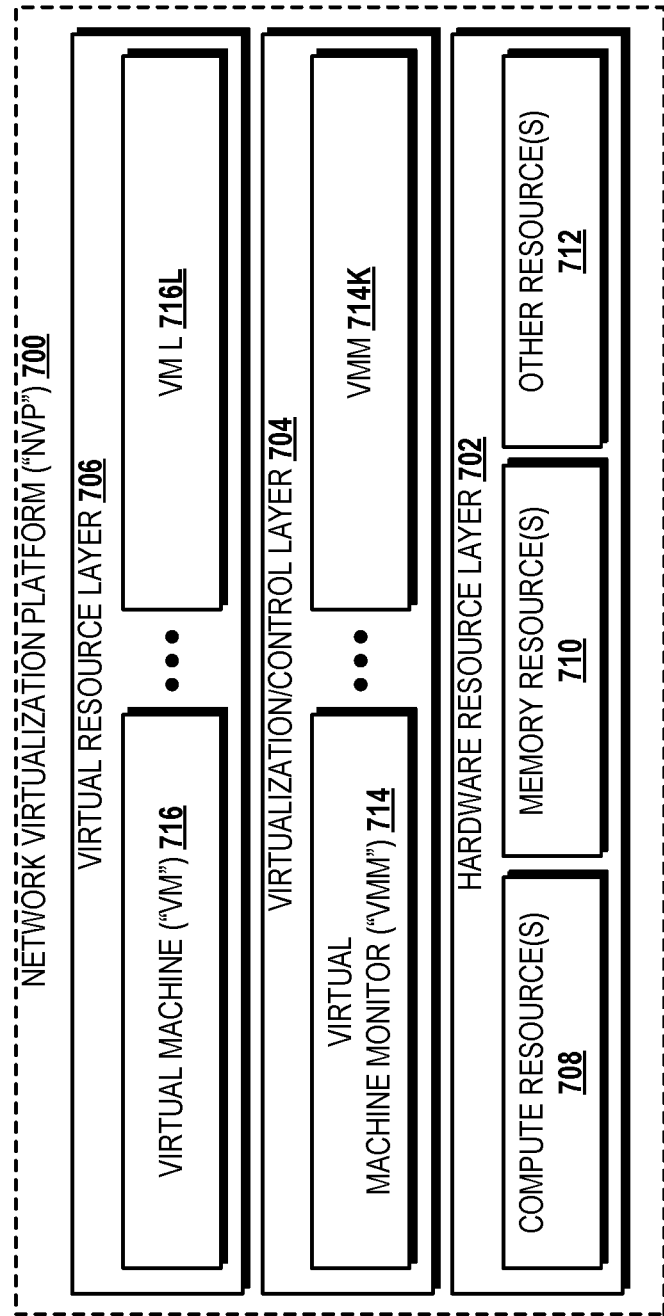
FIG. 7 is a block diagram illustrating a network virtualization platform ("NVP") capable of implementing aspects of the embodiments presented herein.

Turning now to FIG. 7, a block diagram illustrating an illustrative network virtualization platform ("NVP") 700 that can be used to implement, at least in part, the network infrastructure 114, the network 140, and/or at least a portion thereof, introduced above in FIG. 1A will be described, according to an illustrative embodiment. For example, in some embodiments, one or more VNFs 120, VSFs 124, EMFs 130, VSFMFs 132, and/or other network elements of the network infrastructure 114 can be implemented via the NVP 700. The illustrated NVP 700 includes a hardware resource layer 702, a virtualization/control layer 704, and a virtual resource layer 706 that work together to perform operations as will be described in detail herein. The hardware resource layer 702 provides hardware resources, which, in the illustrated embodiment, include one or more compute resources 708, one or more memory resources 710, and one or more other resources 712.

The compute resource(s) 708 can include one or more hardware components that perform computations to process data, and/or to execute computer-executable instructions of one or more application programs, operating systems, and/or other software, to provide, at least in part, any services or composition of services described herein. The compute resources 708 can include one or more central processing units ("CPUs") configured with one or more processing cores. The compute resources 708 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 708 can include one or more discrete GPUs. In some other embodiments, the compute resources 708 can include CPU and GPU components that are configured in accordance with a co-processing CPU/GPU computing model, wherein the sequential part of an application executes on the CPU and the computationally-intensive part is accelerated by the GPU. The compute resources 708 can include one or more system-on-chip ("SoC") components along with one or more other components, including, for example, one or more of the memory resources 710, and/or one or more of the other resources 712. In some embodiments, the compute resources 708 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 708 can be or can include one or more hardware components architected in accordance with an ARM architecture, available for license from ARM HOLDINGS of Cambridge, United Kingdom. Alternatively, the compute resources 708 can be or can include one or more hardware components architected in accordance with an x86 architecture, such an architecture available from INTEL CORPORATION of Mountain View, Calif., and others. Those skilled in the art will appreciate the implementation of the compute resources 708 can utilize various computation architectures or combinations thereof, and as such, the compute resources 708 should not be construed as being limited to any particular computation architecture or combination of computation architectures, including those explicitly disclosed herein.

The memory resource(s) 710 can include one or more hardware components that perform storage operations, including temporary or permanent storage operations. In some embodiments, the memory resource(s) 710 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), erasable programmable ROM ("EPROM"), electrically erasable programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 708.

The other resource(s) 712 can include any other hardware resources that can be utilized by the compute resources(s) 708 and/or the memory resource(s) 710 to perform operations described herein. The other resource(s) 712 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 702 can be virtualized by one or more virtual machine monitors ("VMMs") 714-714K (also known as "hypervisors," hereinafter "VMMs 714") operating within the virtualization/control layer 704 to manage one or more virtual resources that reside in the virtual resource layer 706. The VMMs 714 can be or can include software, firmware, and/or hardware that alone or in combination with other software, firmware, and/or hardware, manages one or more virtual resources operating within the virtual resource layer 706.

The virtual resources operating within the virtual resource layer 706 can include abstractions of at least a portion of the compute resources 708, the memory resources 710, the other resources 712, or any combination thereof. These abstractions are referred to herein as virtual machines ("VMs"). It should be understood, however, that other container technologies can be used and are contemplated. It is understood that as used herein, the term "abstractions" (and variants thereof) is to be interpreted within the realm to networking and computer engineered systems, specifically as a way to describe a layered computer implementation to transform physical, non-generic devices so as to veil an end user from viewing the complexity of network architecture that is executing at lower levels, thereby enabling the transformation of particular machines and implementation of concepts and technologies discussed herein. In no manner shall the term "abstractions" (or variants thereof), be used to interpret or construe the claims in such a way as being directed to an abstract idea or any other judicial exception. In the illustrated embodiment, the virtual resource layer 706 includes VMs 716-716L (hereinafter "VMs 716"). The VMs 716 can execute instructions to provide, at least in part, any services or composition of services described herein, such as but not limited to, the network services 134. In various embodiments, at least one or more of the connectivity monitor tool 136 and/or one or more of the event collectors 138 can be configured to operate as one or more VMs within the operating environment 100.

Based on the foregoing, it should be appreciated that concepts and technologies directed to network fault originator identification for virtual network infrastructure have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
    a processor; and
    a memory that stores computer-executable instructions that, in response to execution by the processor, cause the processor to perform operations comprising:
        determining a network fault condition associated with network infrastructure based on a source ticket that was generated based on a fault reporting schedule comprising a polling time by which fault events and tickets are reported,
        identifying, from the source ticket, a trap set and an alarm set that are associated with origination of the network fault condition,
        collecting, from the network infrastructure, traps associated with the trap set identified from the source ticket and alarms associated with the alarm set identified from the source ticket, wherein at least a portion of the traps and the alarms collected occurred prior to the polling time of the fault reporting schedule used to generate the source ticket,
        determining that a qualified source ticket should be created,
        generating the qualified source ticket based, at least in part, on the source ticket, the traps collected, and the alarms collected, wherein the qualified source ticket comprises a root cause associated with the network fault condition,
        after generating the qualified source ticket, polling for traps and alarms prior to the polling time of the fault reporting schedule, and selecting, based at least in part on the traps and the alarms polled prior to the polling time of the fault reporting schedule, the qualified source ticket, wherein the qualified source ticket comprises the root cause associated with the traps and the alarms.

2. The system of claim 1, wherein the operations further comprise:
creating a network ticket delta indicator based on the qualified source ticket; and
joining the qualified source ticket to an original ticket database.

3. The system of claim 2, wherein the operations further comprise providing the network ticket delta indicator to a ticket delta application executing on a user equipment.

4. The system of claim 3, wherein determining that the qualified source ticket should be created is based on building a root cause correlation information model.

5. The system of claim 1, wherein the traps collected comprise instances of a simple network management protocol trap and the alarms collected comprise a simple network management protocol alarm.

6. The system of claim 1, wherein the network infrastructure comprises a virtual network function, a physical network function, and a network interface.

7. A method comprising:
determining, by a control system communicatively coupled with network infrastructure, a network fault condition associated with the network infrastructure based on a source ticket that was generated based on a fault reporting schedule comprising a polling time by which fault events and tickets are reported;
identifying, by the control system from the source ticket, a trap set and an alarm set that are associated with origination of the network fault condition;
collecting, by the control system from the network infrastructure, traps associated with the trap set identified from the source ticket and alarms associated with the alarm set identified from the source ticket, wherein at least a portion of the traps and the alarms collected occurred prior to the polling time of the fault reporting schedule used to generate the source ticket;
determining that a qualified source ticket should be created;
generating the qualified source ticket based, at least in part, on the source ticket, the traps collected, and the alarms collected, wherein the qualified source ticket comprises a root cause associated with the network fault condition;
after generating the qualified source ticket, polling for traps and alarms prior to the polling time of the fault reporting schedule; and
selecting, based at least in part on the traps and the alarms polled prior to the polling time of the fault reporting schedule, the qualified source ticket, wherein the qualified source ticket comprises the root cause associated with the traps and the alarms.

8. The method of claim 7, further comprising:
creating, by the control system, a network ticket delta indicator based on the qualified source ticket; and
joining, by the control system, the qualified source ticket to an original ticket database.

9. The method of claim 8, further comprising providing, by the control system, the network ticket delta indicator to a ticket delta application executing on a user equipment.

10. The method of claim 9, wherein determining that the qualified source ticket should be created is based on building a root cause correlation information model.

11. The method of claim 7, wherein the traps collected comprise instances of a simple network management protocol trap and the alarms collected comprise a simple network management protocol alarm.

12. The method of claim 7, wherein the network infrastructure comprises a virtual network function, a physical network function, and a network interface.

13. A computer storage medium having computer-executable instructions stored thereon that, in response to execution by a processor of a control system, cause the processor to perform operations comprising:
determining a network fault condition associated with network infrastructure based on a source ticket that was generated based on a fault reporting schedule comprising a polling time by which fault events and tickets are reported;
identifying, from the source ticket, a trap set and an alarm set that are associated with origination of the network fault condition;
collecting, from the network infrastructure, traps associated with the trap set identified from the source ticket and alarms associated with the alarm set identified from the source ticket, wherein at least a portion of the traps and the alarms collected occurred prior to the polling time of the fault reporting schedule used to generate the source ticket;
determining that a qualified source ticket should be created;
generating the qualified source ticket based, at least in part, on the source ticket, the traps collected, and the alarms collected, wherein the qualified source ticket comprises a root cause associated with the network fault condition
after generating the qualified source ticket, polling for traps and alarms prior to the polling time of the fault reporting schedule; and
selecting, based at least in part on the traps and the alarms polled prior to the polling time of the fault reporting schedule, the qualified source ticket, wherein the qualified source ticket comprises the root cause associated with the traps and the alarms.

14. The computer storage medium of claim 13, wherein the operations further comprise
creating a network ticket delta indicator based on the qualified source ticket; and
joining the qualified source ticket to an original ticket database.

15. The computer storage medium of claim 14, wherein the operations further comprise providing the network ticket delta indicator to a ticket delta application executing on a user equipment.

16. The computer storage medium of claim 15, wherein determining that the qualified source ticket should be created is based on building a root cause correlation information model.

17. The computer storage medium of claim 13, wherein the traps collected comprise instances of a simple network management protocol trap and the alarms collected comprise a simple network management protocol alarm.

* * * * *